US011582523B2

(12) United States Patent
Jordan et al.

(10) Patent No.: US 11,582,523 B2
(45) Date of Patent: Feb. 14, 2023

(54) VIDEO-BASED COMPETITION PLATFORM

(71) Applicant: Virtual Arts Inc., Birmingham, MI (US)

(72) Inventors: Ryan Jordan, Austin, TX (US); Richard Sloan, Las Vegas, NV (US); Marco Buhlmann, San Francisco, CA (US); Jeffrey Sloan, Birmingham, MI (US); Gary McKiernan, Bangkok (TH)

(73) Assignee: Virtual Arts, Inc., Birmingham, MI (US)

( * ) Notice: Subject to any disclaimer, the term of this patent is extended or adjusted under 35 U.S.C. 154(b) by 0 days.

(21) Appl. No.: 17/158,229

(22) Filed: Jan. 26, 2021

(65) Prior Publication Data

US 2022/0021938 A1    Jan. 20, 2022

Related U.S. Application Data

(60) Provisional application No. 62/968,821, filed on Jan. 31, 2020.

(51) Int. Cl.
*H04N 21/475*   (2011.01)
*H04N 21/43*    (2011.01)
*G06F 3/16*     (2006.01)

(52) U.S. Cl.
CPC ......... *H04N 21/4758* (2013.01); *G06F 3/165* (2013.01); *H04N 21/43072* (2020.08)

(58) Field of Classification Search
None
See application file for complete search history.

(56) References Cited

U.S. PATENT DOCUMENTS

| | | | |
|---|---|---|---|
| 9,583,142 B1* | 2/2017 | Zhu | H04N 21/8173 |
| 2014/0233913 A1* | 8/2014 | Scharer, III | H04N 9/87 |
| | | | 386/278 |
| 2015/0120446 A1* | 4/2015 | Judd | G07C 13/00 |
| | | | 705/14.54 |
| 2015/0246281 A1* | 9/2015 | Originale Di Criscio | |
| | | | A63F 13/335 |
| | | | 463/31 |

FOREIGN PATENT DOCUMENTS

| | | | | |
|---|---|---|---|---|
| JP | 2020017871 | * | 1/2020 | |
| WO | WO-2018208384 A1 | * | 11/2018 | ......... G06Q 30/0243 |
| WO | WO2018208384 A1 | | 11/2018 | |

OTHER PUBLICATIONS

WIPO, International Preliminary Report on Patentability, dated Jul. 28, 2022, 7 pages.

* cited by examiner

*Primary Examiner* — Omar S Parra
(74) *Attorney, Agent, or Firm* — Brian F. Russell

(57) ABSTRACT

A video-based competition platform supports video-based competitions between possibly geographically distributed competitors. The video-based competition platform enables users of electronic communication devices to create, compete, view, and vote in video-based competitions. In at least some embodiments, a video-based competition is presented to a user with two or more video clips played in conjunction. The video clips may be synchronized to a time base and/or common audio clip.

25 Claims, 21 Drawing Sheets

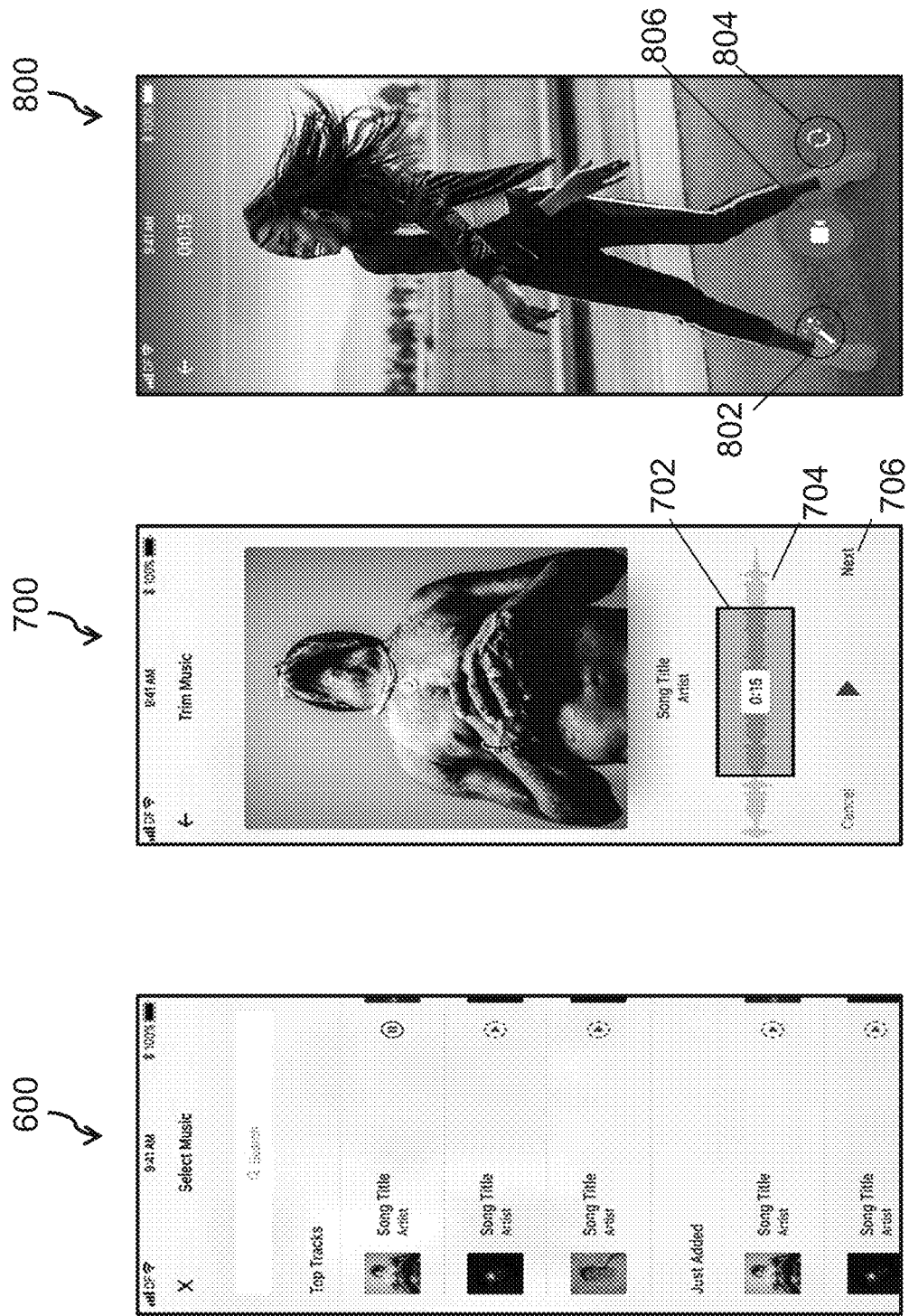

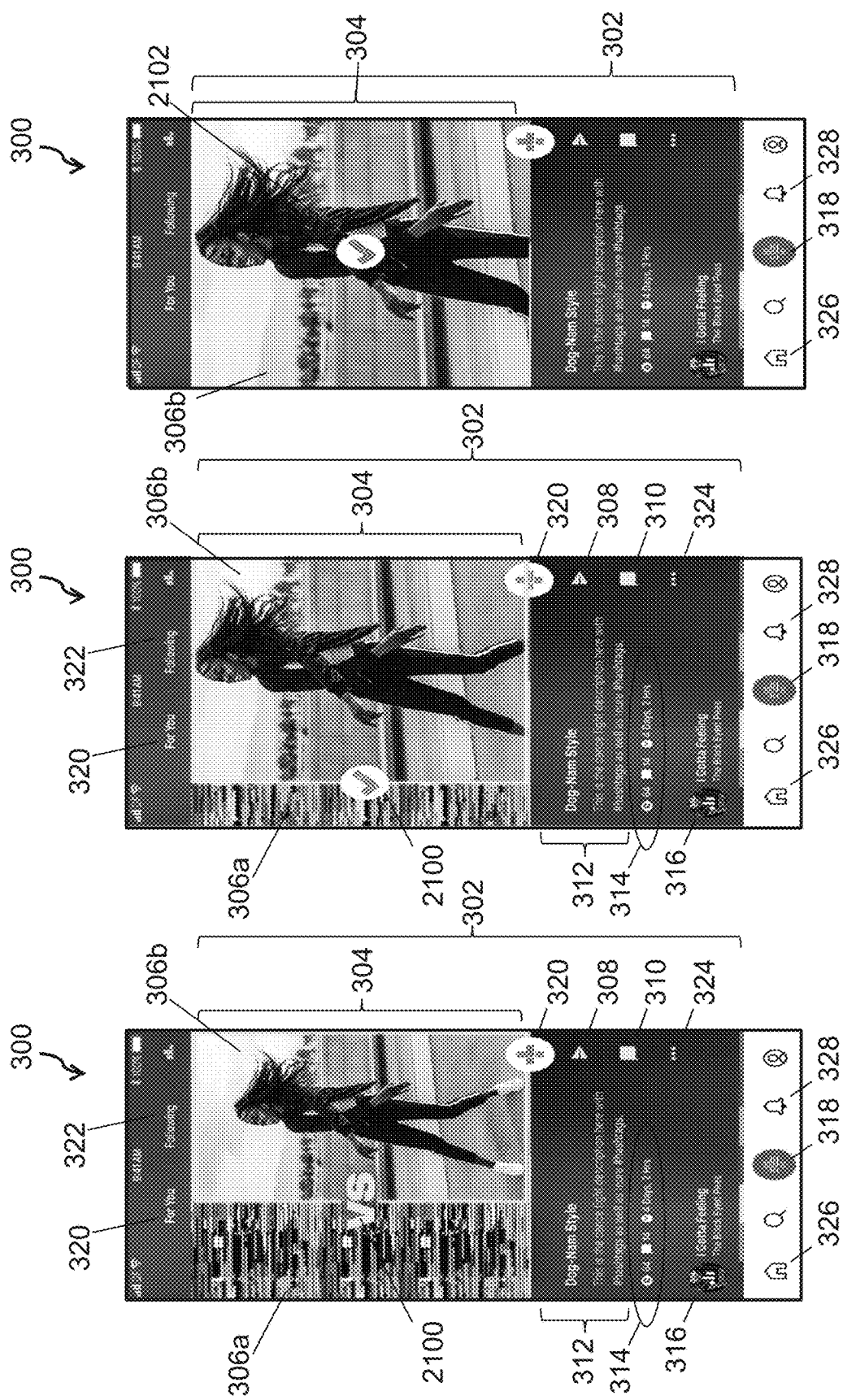

VIDEO-BASED COMPETITION PLATFORM

BACKGROUND OF THE INVENTION

The present invention relates to media, and more specifically, to a video-based competition platform.

With the pervasive use of electronic devices having video capture and/or presentation capability, such as smartphones, laptop computers, tablet computers and smart watches, users now commonly record, edit, and communicate video content. Disclosed herein are techniques for recording, presenting, viewing, and/or voting for video content captured by multiple users in a coordinated manner via a shared video-based competition platform.

BRIEF SUMMARY

A video-based competition platform is provided. In at least some embodiments, the video-based competition platform is hosted on an application service provider platform with which a multiplicity of electronic communication devices communicate via one or more communication networks. In some embodiments, the video-based competition platform may alternatively or additionally be implemented utilizing peer-to-peer communication between the multiplicity of electronic communication devices. The multiplicity of electronic communication devices execute program code, such as browser or application ("app"), through which users can record, present, view, and/or vote for video content on the video-based competition platform.

The disclosed inventions can be implemented as methods, apparatus, and program products. In some embodiments, the disclosed inventions can be performed by special-purpose hardware and/or hardware configured by program code (e.g., firmware or software).

In some embodiments, multiple video clips of a video-based competition are concurrently presented within a display device of a data processing system. The video clips may include, for example, one or more of camera-captured video, animation, rendering, open captions, and/or audio (possibly including verbal or musical content). Independent playback of the multiple video clips may be supported. Based on an input of a user, a vote of the user for one of the plurality of video clips is recorded. The vote may in some embodiments be indicated by gestural input, such as a swipe gesture or a double-tap. Following the vote, play of a lower ranked or losing video clip may be stopped and/or the lower ranked or losing video clip may be removed from the display device.

In some embodiments, the multiple video clips are played in synchrony. In some embodiments, a single audio clip may also be played in synchrony with all of the video clips.

In some embodiments, the multiple video clips are presented with a countdown time of a time remaining to vote. In some embodiments, the vote of the user may be tallied with one or more votes of one or more other users and published as a result of the video-based competition.

In some embodiments, the video-based competition may be presented via one electronic communication device and may be created utilizing another electronic communication device.

In some embodiments, a processor of a data processing system causes a graphical waveform representing a pre-existing audio track to be graphically presented in a display device. Based on one or more first inputs of a first user that designate a graphical first location with respect to the graphical waveform, the processor sets a temporal location within the pre-existing audio track of a start of an audio clip to be excerpted from the pre-existing audio track. Based on one or more second inputs of the first user, the processor causes a video clip to be captured utilizing a camera of the data processing system. The processor merges the audio clip and video clip into a single video asset. The processor initiates inclusion of the video asset in a video-based competition.

In some embodiments, a user is permitted to join an existing video-based competition.

In some embodiments, a video clip may be captured by a camera of a data processing system responsive to or based on a first input of a first user. Based on a second input of the first user, an electronic message inviting a second user to participate as a competitor or voter in a video-based a competition including the video clip may be transmitted.

BRIEF DESCRIPTION OF THE SEVERAL VIEWS OF THE DRAWINGS

FIGS. 6-14 depict exemplary graphical user interfaces that can be utilized to create a video-based competition in accordance with one embodiment;

FIGS. 21A-21C depict an animation of a voting processing in a video-based competition between two competitors in accordance with one embodiment;

Figure 1:
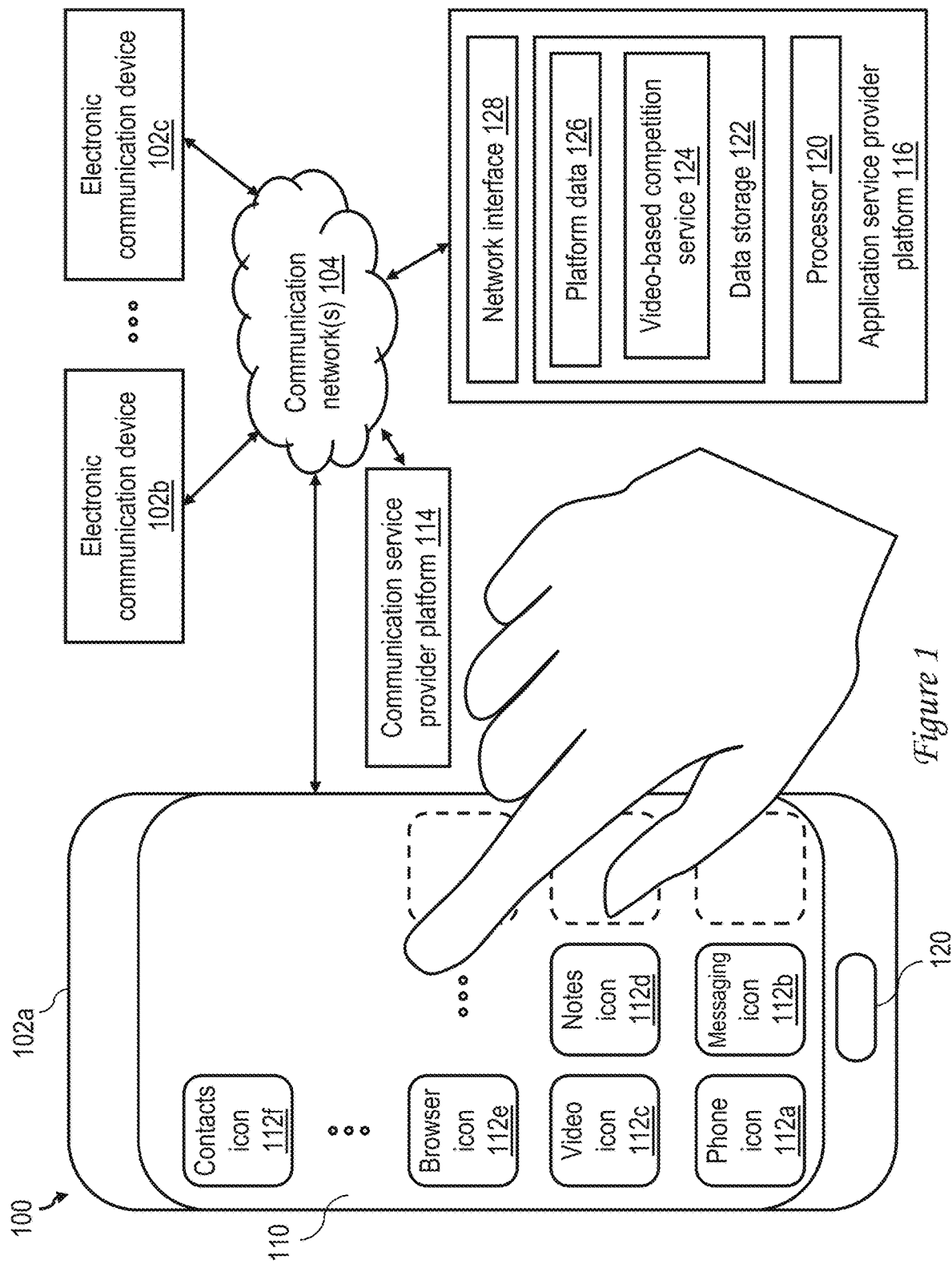
FIG. 1 is a high-level block diagram of an electronic communication environment in accordance with one embodiment.

In the following discussion, each element is identified by a reference numeral generally prefixed by a one or two digit number indicating the figure in which the element first appears. For ease of understanding, like and corresponding reference numerals are utilized to identify like and corresponding elements throughout the figures.

DETAILED DESCRIPTION

With reference now to the figures, and in particular with reference to FIG. 1, there is illustrated an electronic communication environment 100 in which the inventions disclosed herein may advantageously be utilized. Electronic communication environment 100 includes an electronic communication device 102a, which as described in greater detail below may be utilized to communicate electronically with one or more additional electronic communication devices, such as electronic communication devices 102b, 102c, via one or more communication networks 104. In various realizations of electronic communication environment 100, communication network(s) 104 may include, for example, a wireless wide-area network (WAN) including a plurality of distributed terrestrial, atmospheric, and/or satellite-based antennae supporting long range two-way radio frequency communication. Communication network(s) 104 may alternatively or additionally include one or more circuit-switched and/or packet-switched communication networks, including, for example, the Internet.

Communication between electronic communication device 102a and other electronic communication devices may be handled directly by the electronic communication devices themselves (i.e., via peer-to-peer communication) and/or may be facilitated by a third-party platform, such as a communication service provider platform 114 and/or application service provider platform 116. Communication service provider platform 114 is a data processing system associated with and/or operated by a network infrastructure or network service company that provides one or more electronic communication services (e.g., Internet, telephony, text messaging, etc.) to one or more of electronic communication devices 102. Application service provider platform 116 is a data processing system associated with and/or operated by a source or provider of one or more of applications that can executed to provide a video-based competition platform and to support communication between electronic communication devices 102 as discussed further below. Application service provider platform 116 typically includes at least a processor 120, data storage 122, and a network interface 128. Application service provider platform 116 may be configured by program code, such as video-based competition service 124 (as well as other unillustrated program code, such as operating system and web server software), to perform various functions, including providing a network-accessible video-based competition platform, relaying electronic communication between electronic communication devices 102, and providing temporary and/or long term storage of the video and other content generated by electronic communication devices 102 as platform data 126.

Figure 2A:
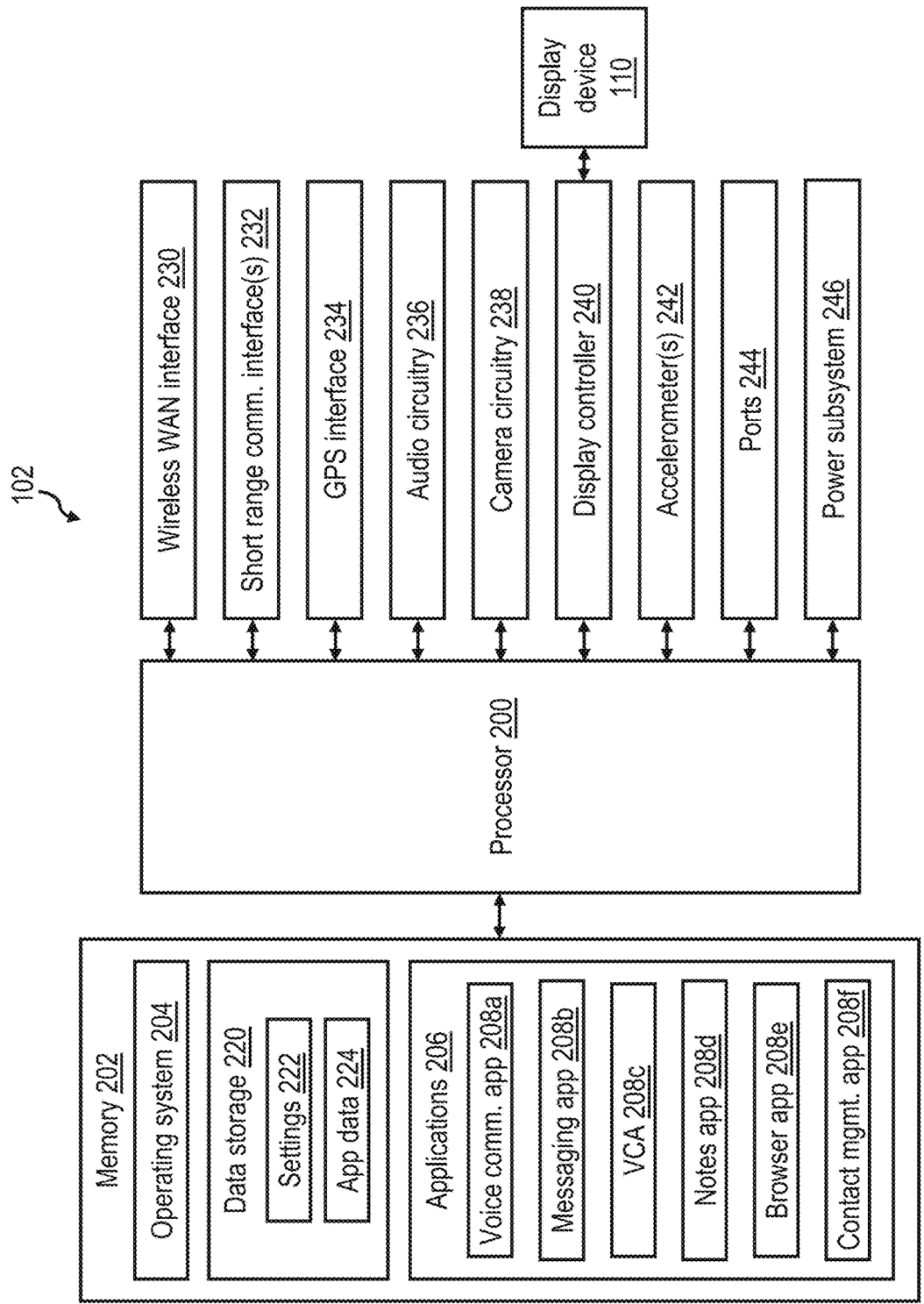
FIG. 2A is a block diagram of an electronic communication device in accordance with one embodiment.

In the illustrated embodiment, an exemplary electronic communication device 102a may comprise, for example, a data processing system, such as a smartphone, smart watch, computer system (e.g., desktop, laptop, or tablet computer), display device (e.g., television set), video game console, etc. In each of these embodiments, electronic communication device 102a includes and/or is coupled to a display device 110, which may be (but is not required to be) a touch-sensitive display device. Electronic communication device 102a may optionally include one or more manually manipulable input buttons 120. Although not required, in the depicted example, electronic communication device 102a presents within display device 110 a graphical user interface including one or more icons 112a-112f, each of which may be selected by a user to invoke execution of a respective corresponding application by electronic communication device 102a. (Exemplary applications are illustrated in FIG. 2A.) In the illustrated example, phone icon 112a corresponds to a voice communication application 208a (which may include video call capability, for example, as supported by Apple® FaceTime™), messaging icon 112b corresponds to a messaging (e.g., texting) application 208b, video-based competition icon 112c corresponds to a video-based competition application 208c, notes icon 112d corresponds to a notes (e.g., text editing) application 208d, browser icon 112e corresponds to a browser application 208e, and contacts icon 112f corresponds to a contact management application 208f. As is known in the art, electronic communication device 102a may execute multiple of these applications concurrently. Further, in some implementations, the functionality of multiple of these applications can be combined into a single application or implemented within a common application framework.

In some embodiments of electronic communication environment 100, one or more of electronic communication devices 102b, 102c may be implemented similarly to electronic communication device 102a. One or more of electronic communication devices 102b, 102c may alternatively or additionally be implemented as an intelligent device (e.g., smarthome controller) having an embedded processor. Network environments including such devices are sometimes referred to as the Internet of Things (IoT).

Referring now to FIG. 2A, there is depicted a high-level block diagram of an exemplary implementation of an electronic communication device 102 in accordance with exemplary embodiments in which the electronic communication device 102 is implemented, for example, as a smartphone, smart watch, desktop computer, laptop computer, tablet computer, etc. Electronic communication device 102 of FIG. 2A can be utilized to implement any of electronic communication devices 102a to 102c of FIG. 1.

As illustrated, electronic communication device 102 includes a processor 200, which may include one or more processor cores for executing program code (e.g., software and/or firmware). As shown, processor 200 is coupled, either directly or indirectly, to a variety of different components within electronic communication device 102. For example, processor 200 is coupled to a memory 202 (e.g., dynamic random access memory (DRAM), static random access memory (SRAM), flash memory, and/or magnetic or optical disk drive, etc.), which provides electronic storage for data and program code (e.g., software and/or firmware) executed by processor 200. The program code stored within memory 202 includes an operating system 204, as well as various applications ("apps") 206. As noted above, applications 206 include voice communication application 208a, messaging (texting) application 208b, video-based competition application (VCA) 208c, notes (text editing) application 208d, browser application 208e, and contact management application 208f. In some embodiments, voice communication application 208a, messaging (texting) application 208b, notes application 208d, browser application 208e, and contact management application 208f can be (but need not be) conventional. VCA 208c, which is not conventional, supports video-based competitions as described in detail below. The video-based competitions supported by VCA 208c can include many different types of competitions, including dance competitions, gymnastics competitions, entertainment competitions, voice (e.g., singing) competitions, comedy competitions, sports competitions, trick competitions, art competitions, cooking competitions, animated competitions, etc.

Data storage 220 within memory 202 may include input data and output data of the processing performed by processor 200. Data accessed and/or processed by applications 206 is referred to herein as application data 224. Data storage 220 may also store settings 222 that control, configure, and/or customize the operation of electronic communication device 102 and/or the program code it executes.

Electronic communication device 102 may include a number of additional components providing, supporting and/or expanding its processing, storage, data collection, data presentation, and/or communication capabilities. For example, electronic communication device 102 includes a wireless WAN interface (e.g., a transceiver and antenna) 230 supporting two-way wireless radio frequency communication with communication network(s) 104. In order to support communication with other electronics within close range, electronic communication device 102 may be further equipped with one or more short range communication interface(s) 232, which may implement protocols for 802.11x, Bluetooth, 900 MHz communication or the like. Electronic communication device 102 may further include a global positioning satellite (GPS) interface 234 (e.g., GPS receiver and GPS antenna) that receives GPS signals from GPS satellites and processes the GPS signals to provide location information to processor 200.

Electronic communication device 102 may also include audio circuitry 236 (e.g., at least an audio interface optionally further coupled to microphone(s) and speaker(s)), camera circuitry 238 (e.g., including one or more forward facing or rear facing cameras having video and/or still recording capabilities), and a display controller 240 for presenting video and/or image data via display device 110. Electronic communication device 102 may additionally include one or more accelerometers 242 that can be utilized by electronic communication device 102 to sense and/or determine the position, attitude, velocity, and/or acceleration of electronic communication device 102. One or more ports 244 may also optionally be utilized to expand the processing, communication and/or data storage capabilities of electronic communication device 102. Finally, electronic communication device 102 includes a power subsystem 246 that powers processor 200 and the other components of electronic communication device 102. Power subsystem 246 may include, for example, a battery and/or power port through which the battery may be charged from an AC power source or wireless inductive charging device.

Although FIG. 2A illustrates a number of components separately for ease of understanding, it will be appreciated by those skilled in the art that, in at least some embodiments, multiple of the illustrated components may be integrated within a common integrated circuit die or package.

Figure 2B:
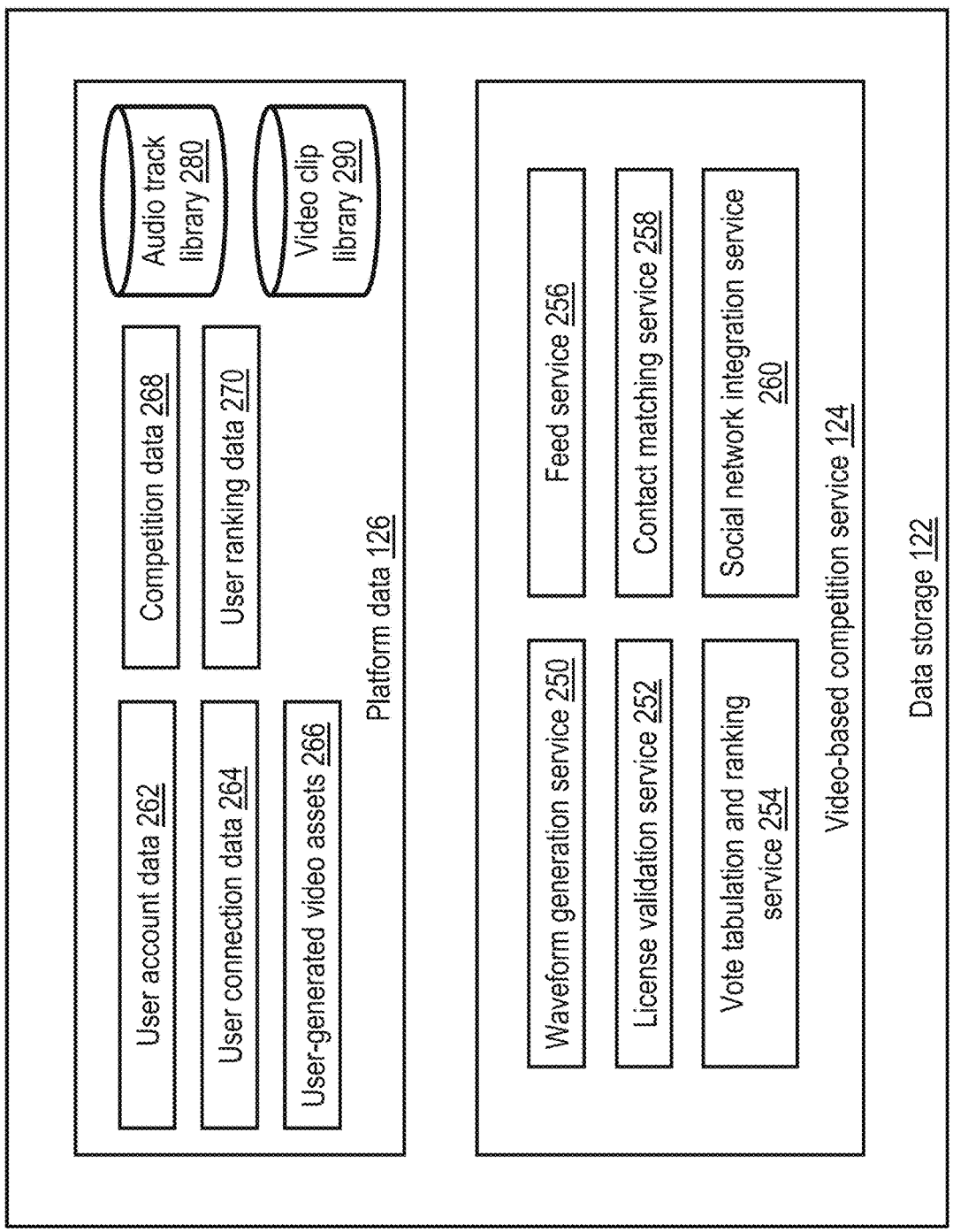
FIG. 2B is a block diagram of data storage of an application service provider platform in accordance with one embodiment.

FIG. 2B provides a more detailed view of the data storage 122 of application service provider platform 116 in accordance with one embodiment. In the illustrated embodiment, the platform data 126 of application service provider platform 116 includes user account data 262 (e.g., user name, password, user preferences, access history, etc.) of users of VCA 208c, user connection data 264 defining social media connections between users of VCA 208c and other parties (which may or may not also be users of VCA 208c), and user-generated video assets 266 generated by users of VCA 208c. Platform data 126 may also include competition data 268 defining competitions between two or more users of VCA 208c. In addition, platform data 126 includes user ranking data 270, which can include, for example, votes made by and/or received by the users of VCA 208c, awards earned by users of VCA 208c, and relative rankings of users of VCA 208c. Platform data 126 further includes an audio track library 280 including audio tracks that may be selected by users of VCA 208c for use in creating user-generated video assets 266. Platform data 126 additionally includes a video clip library 290 including pre-existing video clips that may be accessed by users of VCA 208c.

Video-based competition service 124 includes a collection of services that can be implemented, for example, by software and/or firmware executing on suitable data processing system hardware. In this example, these services include a waveform generation service 250, which generates graphical waveform patterns of audio tracks in an audio track library 280 and distributes the graphical waveform patterns on request to instances of VCA 208c. In addition, the services provided by video-based competition service 124 include a license validation service 252 that can be utilized to restrict access by users of VCA 208c to some or all of user-generated video assets 266, audio track library 280, and/or video clip library 290 based on the availability of applicable legal permissions (e.g., copyright license(s)). In this example, video-based competition service 124 also includes a vote tabulation and ranking service 254 that determines, records, and reports outcomes of video-based competitions between users of VCA 208c, a feed service 256 that curates the main feeds provided to users of VCA 208c via VCA 208c as discussed further below, and a contact matching service 258 that determines and recommends social connections to users of VCA 208c. Video-based competition service 124 may optionally also include a social network integration service 260 that supports integration of some or all of the services of a different social media platform (e.g., Snapchat, Instagram, TikTok, etc.) with VCA 208c. This off-platform social media integration allows video-based competition service 124 to identify and communicate with off-platform social media contacts of users of video-based competition service 124 in a seamless manner, as discussed further below.

Figure 4:
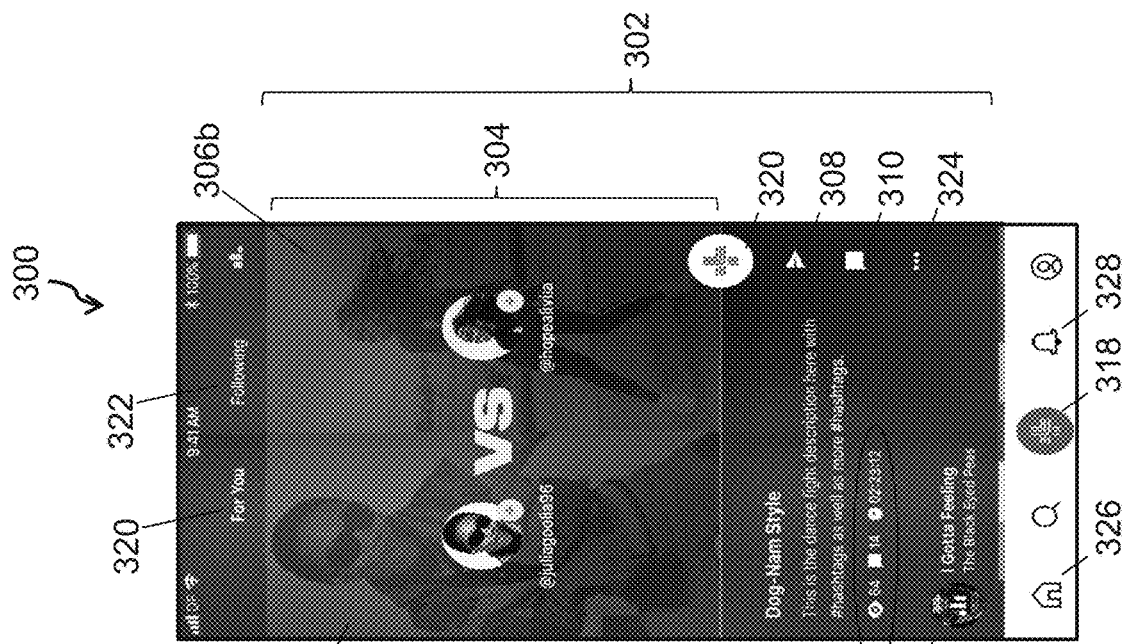
FIGS. 3-4 illustrate exemplary graphical user interfaces of a main feed of a video-based competition application in accordance with one embodiment.
Figure 3:
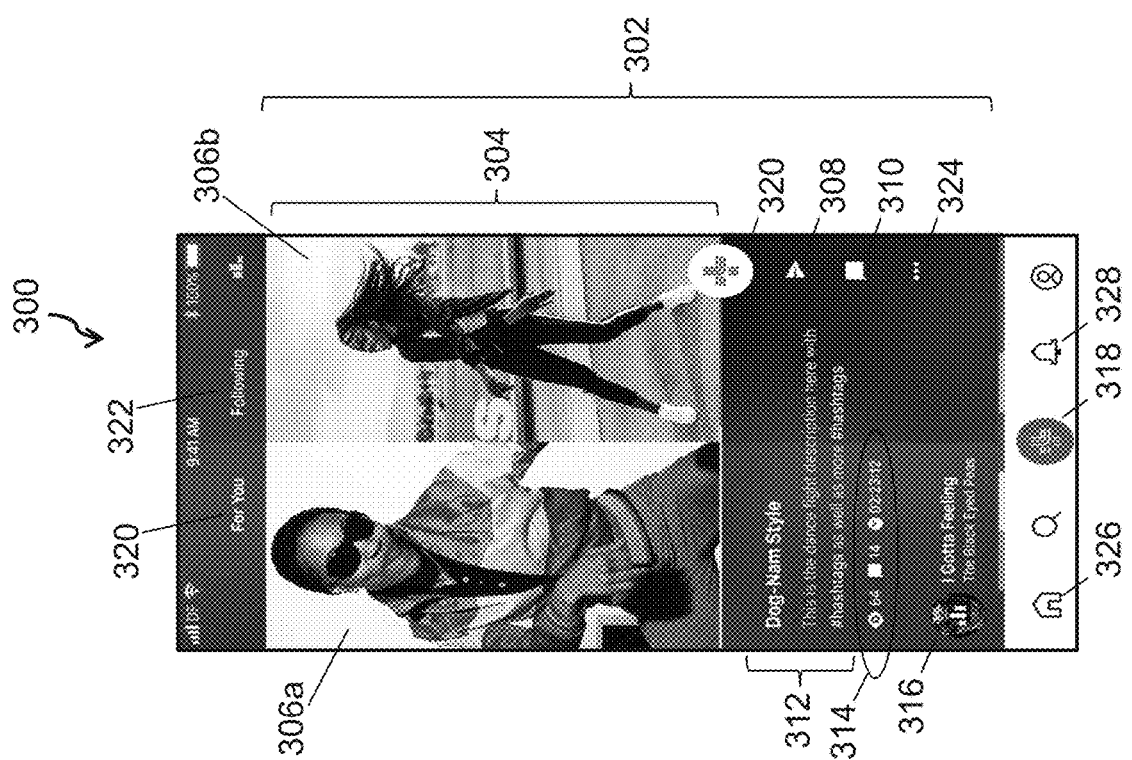

With reference now to FIGS. 3-4, an exemplary graphical user interface 300 presenting a main feed is illustrated. VCA 208c can cause an electronic communication device 102 to present graphical user interface 300 within display device 110, for example, as a default view in response to launching of VCA 208*c* based on user selection of video-based competition icon 112*c* or in response to user selection of a home control 326 available in certain interfaces of VCA 208*c*. Alternatively, in a browser-based embodiment, graphical user interface 300 can be presented by a browser application 208*e* based on content served by application service provider platform 116. In general, in the following description, the presentation of graphical user interface 300 and other user interfaces by VCA 208*c* is assumed. In the depicted embodiment of graphical user interface 300, graphical user interface 300 is generally sized to fit the dimensions and form factor of the display device 110 of a smartphone. Those skilled in the art will appreciate, however, that the main feed can be automatically resized or reconfigured for attractive presentation within displays of other form factors (e.g., the 16:9 form factor typical for televisions and laptop computer displays).

The main feed is a scrollable collection of multiple different video-based competitions. Although other presentation modalities can be utilized, in the depicted embodiment the main feed is presented as a continuous, vertically scrollable collection in which each of the multiple video-based competitions is presented within a respective pane 302 (only one of which is shown). Pane 302 includes a video field 304 in which two or more video assets (e.g., video clips 306*a*, 306*b*) are presented to the user contemporaneously. The video clips 306*a*, 306*b* may include, for example, one or more of camera-captured video, animation, rendering, open captions, and/or audio (possibly including verbal or musical content).

In at least some embodiments, graphical user interface 300 presents each of video clips 306 in its own respective independently controllable video player. A user can therefore independently interact with one or more of the video clips. For example, in some embodiments, the user can independently apply visual effects and/or filters to one or more of the video clips 306. In some embodiments the user can independently drag (reposition) and/or resize each of the video players. Further, in some embodiments, graphical user interface 300 provides separate playback controls for each video clip 306 presented in video field 304 so that the user can play, skip forward, skip backward, rewind (reverse play), replay, pause, and/or stop each video clip independently. In this manner, the user has fine-grained control of each video clip for ease of evaluation and/or comparison. In some embodiments, these playback controls are generally concealed, but are presented layered on top of or adjacent each video clip in response to a selected input, for example, in response to the user tapping once on one of the video clips 306.

In at least some embodiments, video clips 306*a*, 306*b* are presented in a coordinated manner, meaning that the timing of the play of video clips 306*a*, 306*b* is synchronized in a user-selected or predetermined manner. For example, in some preferred embodiments, the presentation of the depicted content (e.g., the subjects of the video clips) is coordinated so that the subjects of the video clips are seen to make the same or similar movements simultaneously. In some embodiments, the presentation of the video content of the multiple video is synchronized to a common time base or to a common audio track, as discussed further below. In some embodiments, the presentation of the video content is coordinated so that the video content in each of the video clips plays one-at-a-time in sequential order. In at least some embodiments, video clips 306*a*, 306*b* can be toggled by the user between a "live" state in which video clips 306*a*, 306*b* (or at least portions thereof) are played in continuous loops (as shown in FIG. 3) and a "paused" state in which play of video clips 306*a*, 306*b* is paused (as shown in FIG. 4), by alternate selection of a play control 308 and a stop control 310. When coordinated presentation of the play of video clips 306 is implemented, an observer service within the presenting software (e.g., VAC 208*c* or video-based competition service 124) observes the video players presenting video clips 306 and, in the event of an error or a latency issue that would cause one video play to fail playback or to lag behind the other video player(s), pauses all video players until the video players are able to proceed with coordinated playback.

Pane 302 can include additional information regarding the video-based competition, at least some of which can be accessed from competition data 268. For example, in the depicted example pane 302 includes a descriptor 312 providing a title and brief description of the video-based competition. In addition, pane 302 can provide competition metadata 314, such as a number of views by different users (in this case, 64), a number of user comments (in this case, 14), and a remaining duration for voting in the video-based competition (in this case, 2 hours, 23 minutes, and 12 seconds). In this example, pane 302 additionally provides an audio track identifier 316 identifying an audio track (and artist of the audio track) from which an audio clip played in conjunction with video clips 306*a*, 308*b* is taken.

Graphical user interface 300 additionally includes various controls that permit a user to initiate a number of different actions. For example, graphical user interface 300 includes a create control 318 that permits a user to create a video-based competition via VCA 208*c*. An exemplary process by which a user can create a video-based competition is described below with reference to FIGS. 5-14. Pane 302 also includes a join control 320, which when selected by the user permits the user to join an existing video-based competition presented in the main feed. An exemplary process by which a user can join an existing video-based competition is described below with reference to FIGS. 19-20. In addition, pane 302 additionally includes options control 324 that exposes additional controls that permit a user to comment on a video-based competition, share a video-based competition off-platform, establish a social connection with another user, or initiate other actions, as discussed further herein. Graphical user interface 300 also includes an activity feed control 328, which, when selected, causes VCA 208*c* to present an activity feed providing a running digest of messages and/or alerts relating to the user's activities on the video-based competition platform.

In some embodiments, the particular video-based competitions presented within the main feed to a given user can be determined in accordance with the user's preferences. For example, in some embodiments represented by graphical user interface 300 of FIG. 3, the video-based competitions presented within the main feed of a given user are controlled through alternative user selection of "For you" control 320 (which can be the default selection) or "Following" control 322. In one exemplary embodiment, application service provider platform 116 selects the particular video-based competitions included in a user's "For You" view of the main feed based on the user's past history of viewing experiences and/or engagement with VCA 208*c*. The video-based competitions included in the user's "Following" view of the main feed presents video content from any users and/or video-based competitions the user has followed within VCA 208*c* or engaged with (e.g., voted on).

Figure 33:
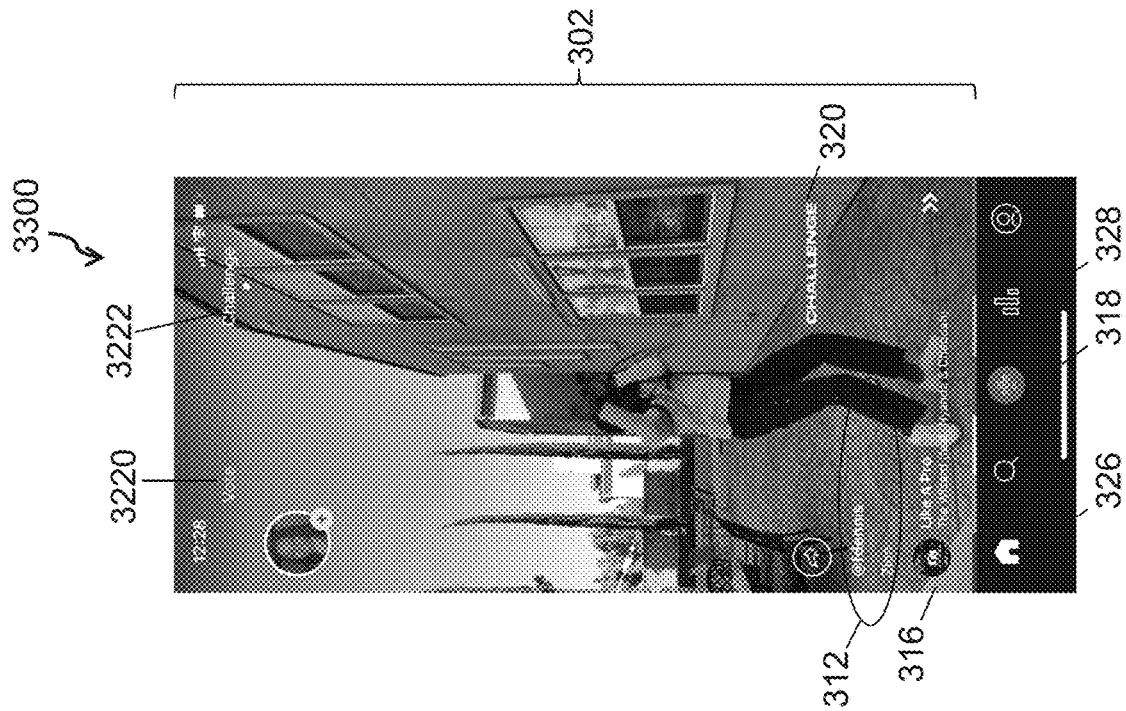
FIGS. 32-33 depict graphical user interfaces through which a user can control presentation of the user's main feed through alternative selection of a "Vote" control and a "Challenge" control.
Figure 32:
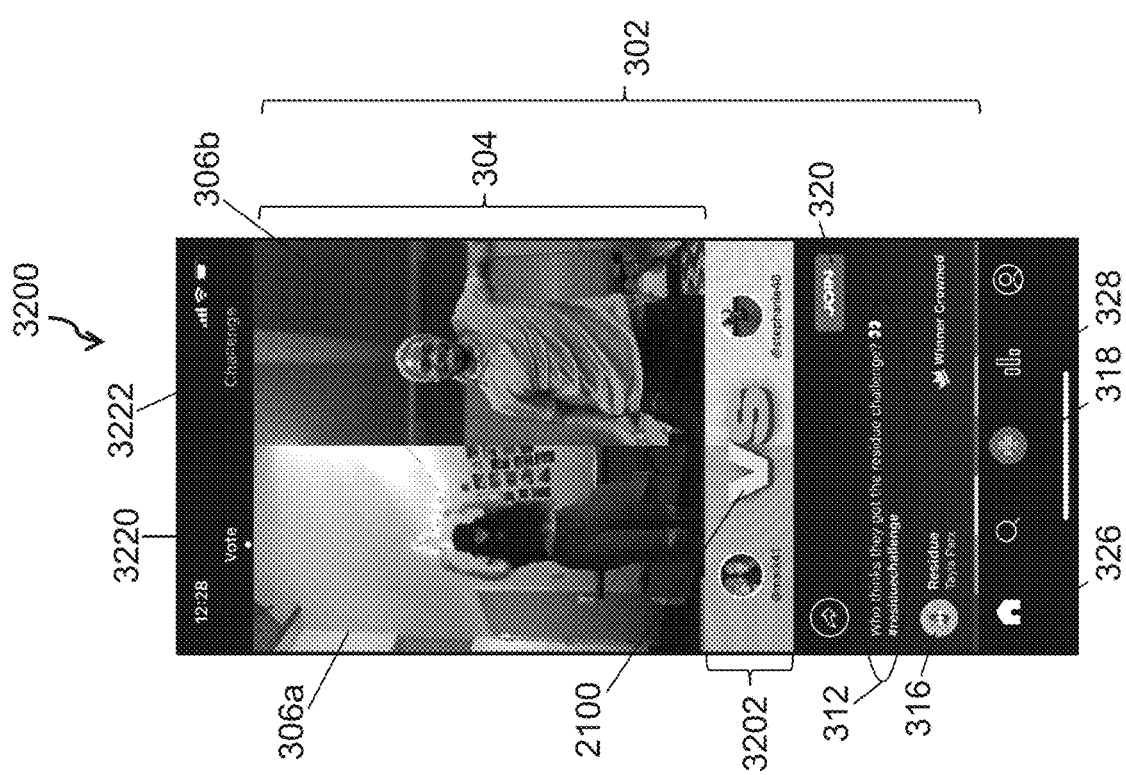

In other embodiments, the video-based competitions presented within a given user's main feed can be determined based on alternative or additional controls. For example, in the embodiment represented by graphical user interface 3200 of FIG. 32 and graphical user interface 3300 of FIG. 33, the contents presented within a given user's main feed can be controlled by the user through alternative selection of a "Vote" control 3220 (which is selected in FIG. 32) and a "Challenge" control 3222 (which is selected in FIG. 33). In this example, based on user selection of "Vote" control 3220, feed service 256 of video-based competition service 124 presents a collection of multiple video-based competitions (one per pane 302 in a vertically or horizontally scrollable collection) in which the user can vote for one of the competitors identified in competitor field 3202 (as discussed below with reference to FIGS. 21A to 21C) or which the user can join as a competitor by selection of join control 320 (as discussed below with reference to FIG. 19). In at least some embodiments, feed service 256 automatically tailors the contents of the video-based competitions to user interaction with VCA 208c over time.

Based on user selection of "Challenge" control 3222, feed service 256 of video-based competition service 124 presents a collection of multiple open video-based competitions (one per pane 302 in a vertically or horizontally scrollable collection) which the user can join as a competitor by selection of join control 320 (as discussed below with reference to FIG. 19). In the example given in FIG. 33, only a single video asset of the competitor who initiated creation of the video-based competition is presented within each pane 302.

Figure 5:
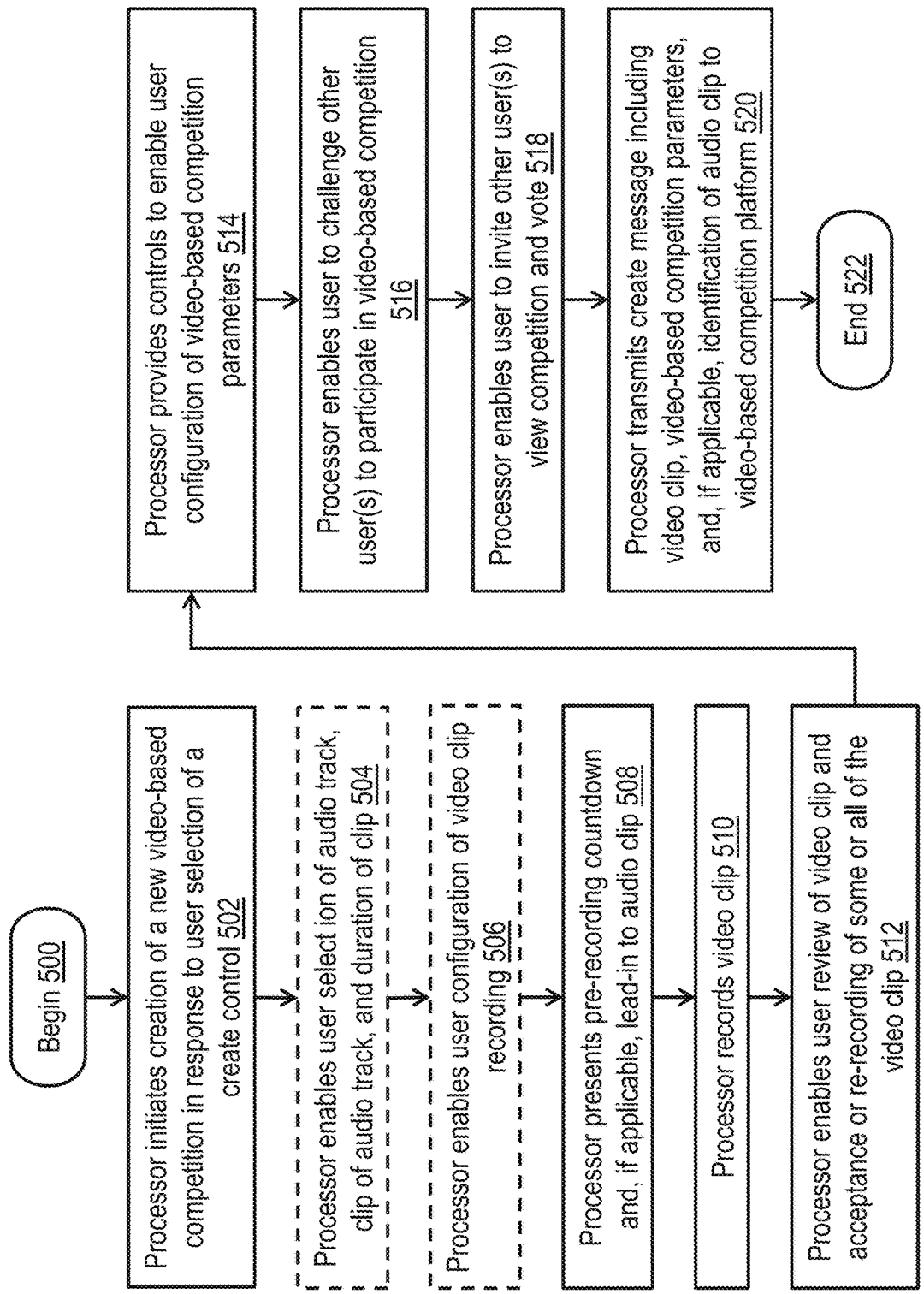
FIG. 5 is a high-level logical flowchart of an exemplary process of creating a video-based competition in accordance with one embodiment.
Figure 11:
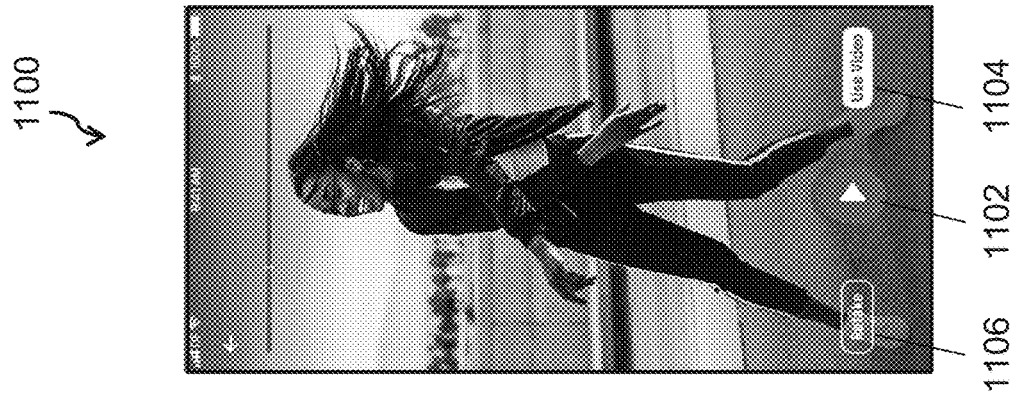

With reference now to FIG. 5, there is depicted a high-level logical flowchart of an exemplary process by a video-based competition can be created in accordance with one embodiment. The illustrated process can be performed by a processor 200 of an electronic communication device 102 (e.g., in response to execution by the electronic communication device 102 of program code, such as VCA 208c and/or browser application 208e) and/or by a processor 120 of application service provider platform 116 (e.g., in response to execution of software implementing video-based competition service 124). To promote greater understanding, the process of FIG. 5 is described with reference to examples of graphical user interfaces given in FIGS. 6-14. It should be understood that the inventions described herein are not limited to the disclosed exemplary interfaces and can be realized utilizing many alternative interfaces.

The process of FIG. 5 begins at block 500 and then proceeds to block 502, which depicts the processor initiating a process of creating a new video-based competition, for example, in response to user selection of create control 318 within graphical user interface 300. The process then proceeds to optional block 504, which illustrates the processor enabling user selection of an audio track from which an audio clip can be selected for presentation in conjunction with a video clip, for example, through an audio track library graphical user interface. FIG. 6 depicts an exemplary audio track library graphical user interface 600 through which a user can search for an audio track (e.g., in audio track library 280, the user's own audio track library, or a streaming music service such as Spotify®) based on track (e.g., song) title, artist, album, release date, genre, etc. The user can also preview (e.g., audibly play) one or more audio tracks.

As further indicated at optional block 504, in response to user selection of an audio track (e.g., by a tap, double-tap, swipe, or other gestural input), the processor may further enable selection of an audio clip and audio clip duration, for example, through a clip selection graphical user interface. FIG. 7 illustrates an exemplary clip selection graphical user interface 700 through which the user can choose a desired portion (clip) of the audio track selected in audio track library graphical user interface 600 and a desired duration or length of the audio clip (e.g., 2-30 seconds). In the illustrated embodiment, clip selection graphical user interface 700 presents as a time-domain graph 704 of a waveform generated for the selected audio track, for example, by waveform generation service 250. In the depicted example, time-domain graph 704 includes a graphical waveform representing amplitude variations over the duration of the selected audio track. Clip selection graphical user interface 700 graphically overlays a bounding rectangle 702 over time-domain graph 704 The user can easily select both a desired clip from the audio track and the duration of the audio clip by sliding bounding rectangle 702 relative to time-domain graph 704 (e.g., sliding bounding rectangle 702 to the left to indicate an earlier portion of the audio track and sliding bounding rectangle 702 to the right to indicate a later portion of the audio track) and/or by resizing bounding rectangle 702 utilizing conventional drag-and-drop and/or resizing input techniques. In some embodiments, the user decreasing the duration of the audio clip causes graphical user interface 600 to increase the resolution of the waveform presented in time-domain graph 704. User selection of a desired audio clip is preferably facilitated by audio presentation via audio circuitry 236 of the selected audio clip each time the user relocates and/or resizes bounding rectangle 702. This audio preview enables the user to audibly verify that the desired subset of the audio track is included within the audio clip.

In a preferred embodiment, the selection of duration of the audio clip, if supported, is also automatically utilized as the duration of the video clip that is to be recorded. In embodiments in which user selection of the duration of the audio clip (or user selection of the audio clip itself) is omitted, the user is preferably (but not necessarily) permitted to specify a desired duration of the video clip. In embodiments in which the user selects an audio clip to present in conjunction with the user's video clip, it should be appreciated that the audio clip can be presented in conjunction with the user's video clip in lieu of or in addition to any audio content recorded by audio circuitry 236 during video capture by the user's electronic communication device 102.

Figure 9:

In response to receipt of an input indicating completion of selection of the audio clip and its duration at optional block 504 (e.g., user selection of Next control 706), VCA 208c translates the user interface coordinates of bounding rectangle 702 into a starting temporal location and an ending temporal location within the selected audio track. The process of FIG. 5 proceeds to optional block 506, which depicts the processor enabling user configuration of video clip recording, for example, through selection of corresponding controls in a record graphical user interface 800. In the depicted example, a user can choose to apply video effects/filters, for example, through selection of effects control 802, and/or can choose between use of front-facing and rear-facing cameras, for example, through selection of camera control 804. In response to receipt of an input indicating user readiness to capture the video clip (e.g., user selection of record control 806 in record graphical user interface 800), the process of FIG. 5 proceeds from optional block 506 to block 508, which illustrates the processor presenting in display device 110 a pre-recording countdown (e.g., 3-2-1) and, if applicable, a lead-in portion of the selected audio track immediately prior to the audio clip selected at block 504. FIG. 9 illustrates an exemplary countdown graphical user interface 900 that presents the pre-recording countdown in conjunction with audio presentation of the audio track lead-in.

Figure 10:
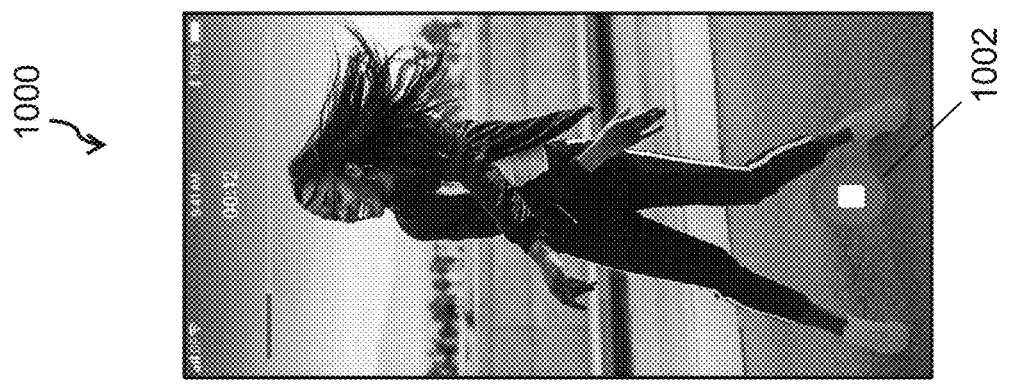

At the conclusion of the pre-recording countdown, the processor causes video content to be captured via camera circuitry 238 (and displayed as a live view in display device 110), as shown in graphical user interface 1000 of FIG. 10 (block 510). If an audio clip is to be presented in conjunction with the captured video clip, the audio clip is preferably presented via audio circuitry 236 during the video capture. In at least some embodiments, the processor enables the user to record the video clip in one continuous video "take" or to build the video clip from multiple video segments. In graphical user interface 1000 of FIG. 10, the user can pause or end recording of the video segment through selection of stop control 1002. In some embodiments, the processor automatically ends recording of the video clip at the end of the audio clip. The captured video content can be stored, for example, locally in application data 224 or in a network-connected remote location, such as application service provider platform 116 or communication service provider platform 114.

At the conclusion of the recording of the video clip, the processor preferably enables the user to review and to accept or reject use of the video clip (block 512). For example, in the exemplary review graphical user interface 1100 given in FIG. 11, the user can select play control 1102 to cause VCA 208c to present the video clip captured at block 510. In addition, the user can select acceptance control 1104 in order to accept the video clip for use in the video-based competition or can select retake control 1106 to initiate a process of recapturing a segment of, or the entire video clip. If only one or more segments of the video clip are to be re-recorded, VCA 208c preferably requeues the audio clip, if present, to the location corresponding to the beginning of each re-recorded video segment and then audibly presents the corresponding segment of the audio clip from that point.

In response to user acceptance of the video clip, as indicated, for example, by selection of acceptable control 1104, the processor merges the audio clip and the associated video clip into a single video asset and stores the video asset as one of user-generated video assets 266. The process of FIG. 5 proceeds from block 512 to block 514, which illustrates the processor exposing to the user one or more controls to enable the user to configure parameters of the video-based competition. These video-based competition parameters can be stored as part of competition data 268. For example, as shown in exemplary configuration graphical user interface 1200 of FIG. 12, the processor may allow the user to create a textual title for the video-based competition via title field 1202, provide a textual description of the video-based competition via description field 1204, allow or deny comments by other users (viewable in the main feed) via comment control 1206, enable or disable voting in the video-based competition by other users via voting control 1208, and determine competition duration (i.e., how long other users can vote in the video-based competition) via duration control 1210. In one exemplary embodiment, the range of possible competition durations is constrained, for example, in the range of 10 minutes to 14 days. In some embodiments, voting is permitted to commence (and the voting duration starts) in response to at least one user accepting the challenge to participate in the video-based competition and recording his or her own video clip. Once voting is closed, the processor (e.g., via vote tabulation and ranking service 254) tallies the votes, determines the winner of the video-based competition, and publishes the winner on the main feed of one or more users that are permitted to view the video-based competition and/or its result.

Figures 12, 13, 14:
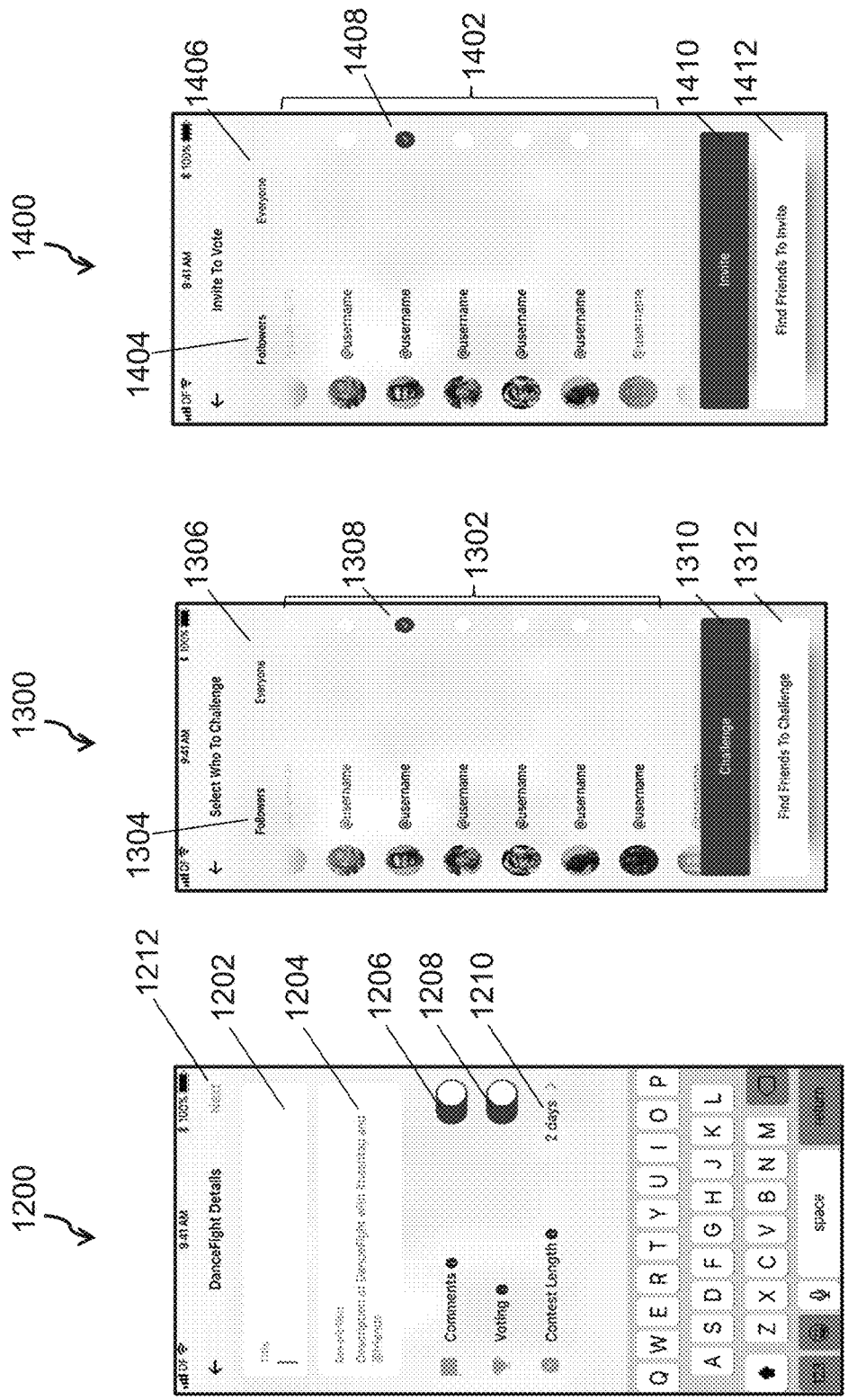

In response to receipt of an input indicating that the user has completed configuring parameters of the video-based competition (e.g., via selection of next control 1212), the processor presents an interface that enables the user to challenge one or more other users to participate in the video-based competition (block 516). For example, in one embodiment, the processor can present for selection a first list of other users of the video-based competition platform accessible via VCA 208c that are "friends" or "followers" or "connections" or "contacts" of the user either on-platform or off-platform (e.g., having contact information stored in contact management application 208f or having a social connection with the user via a third-party social media platform). In at least some embodiments, the user may optionally or additionally have the ability to view and select users from a presentation of a second list including all users or users of the video-based competition platform with which the user of VCA 208c is not currently connected. For example, in exemplary challenge graphical user interface 1300 of FIG. 13, the processor presents the first list 1302 by default and in response to user selection of first list control 1304 and alternatively presents the second list in response to selection of second list control 1306. The user can select one or more users from the first or second lists, for example, by tapping on the associated check box(es) 1308. Once the user has selected one or more users from the first and/or second lists, the user confirms completion of the selection of users to be challenged to compete in the video-based competition via selection of challenge control 1310. In the embodiment of FIG. 13, the processor additionally enables the user to invite contacts from off of the video-based competition platform (e.g., having email or phone contact information in contact management application 208f or having a social connection with the user via a third-party social media platform) to join the video-based competition platform and participate as a competitor in the video-based competition via find friends control 1312. These off-platform invitations can be communicated, for example, via text messaging, email, and/or social media messages.

In response to receipt of an input indicating that the user has completed selection of users to challenge to participate in the video-based competition (e.g., via selection of challenge control 1310), the processor presents an interface that enables the user to invite one or more other users on or off the video-based competition platform to view and vote in the video-based competition (block 518). For example, in one embodiment, the processor can present for selection a first list of other users of the video-based competition platform accessible via VCA 208c that are "friends" or "followers" or "connections" or "contacts" of the user either on-platform or off-platform (e.g., having contact information stored in contact management application 208f or having a social connection with the user via a third-party social media platform). In at least some embodiments, the user may optionally or additionally have the ability to view and select users from a presentation of a second list including all users or users of the video-based competition platform with which the user of VCA 208c is not currently connected. For example, in exemplary challenge graphical user interface 1400 of FIG. 14, the processor presents the first list 1402 by default and in response to user selection of first list control 1404 and alternatively presents the second list in response to selection of second list control 1406. The user can select one or more users from the first or second lists, for example, by tapping on the associated check box(es) 1408. Once the user has selected one or more users from the first and/or second lists, the user confirms completion of the selection of users to be invited to view and vote in the video-based competition via selection of invite control 1410. In the embodiment of FIG. 14, the processor additionally enables the user to invite contacts from off of the video-based competition platform (e.g., having email or phone contact information in contact management application 208f or having a social connection with the user via a third-party social media platform) to join the video-based competition platform and/or vote in the video-based competition via find friends control 1412. These off-platform invitations can be communicated, for example, via text messaging, email, and/or social media messages.

At block 520, the processor additionally transmits a create message including the components of the video-based competition (e.g., video clip, video-based competition parameters, identification of audio clip) to the video-based competition platform hosted on application service provider platform 116. Based on these components of the video-based competition, video-based competition service 124 records the competition data as part of competition data 268, and feed service 256 publishes a frame 302 containing the video-based competition in the main feed of one or more other users of the video-based competition platform, as illustrated in FIG. 3 and as discussed in greater detail below with reference to FIG. 15. Following block 520, the process of FIG. 5 ends at block 522.

Figure 15:
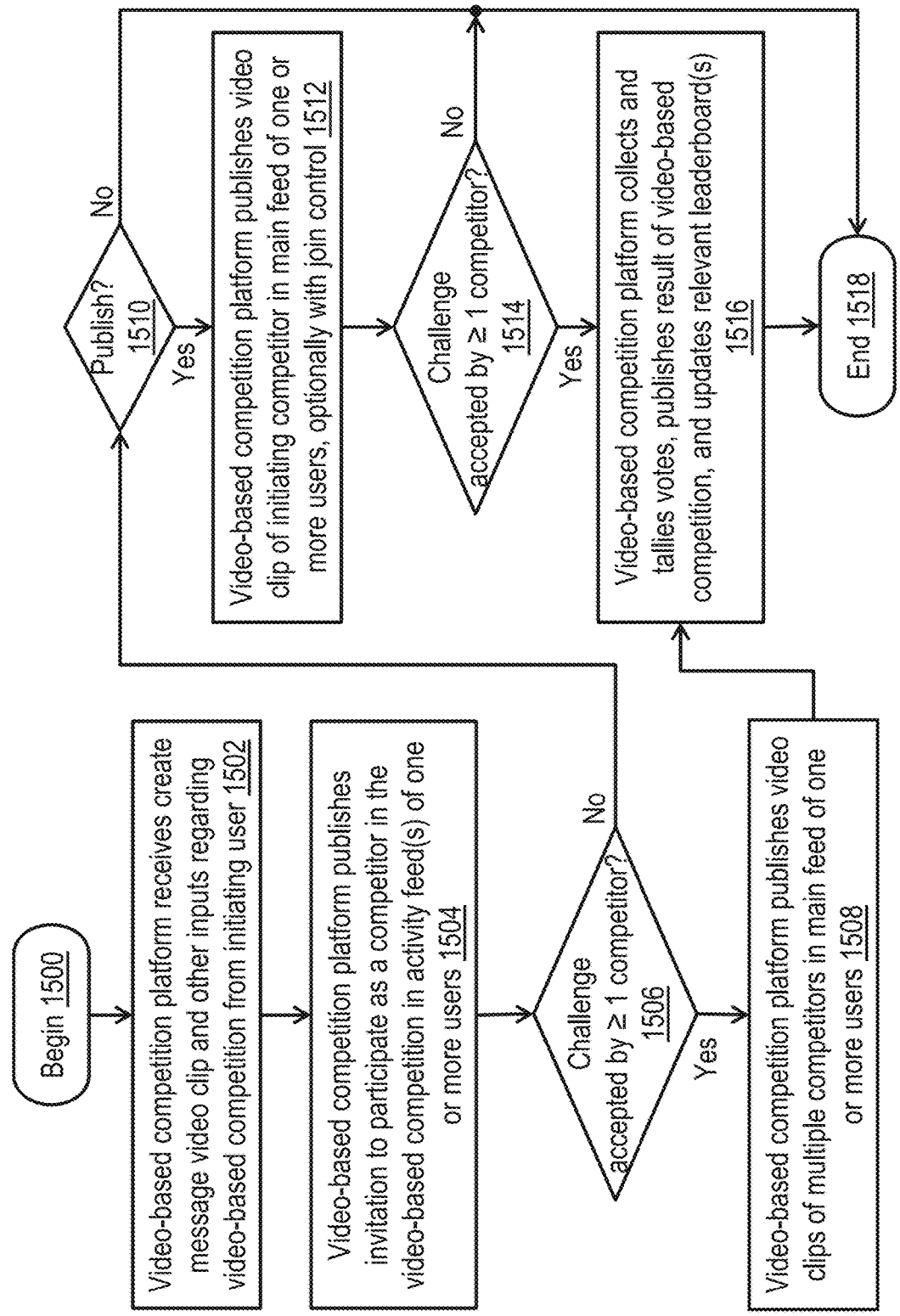
FIG. 15 is a high-level logical flowchart of an exemplary process by which a video-based competition platform manages a video-based competition in accordance with one embodiment.

With reference now to FIG. 15, there is depicted a high-level logical flowchart of an exemplary process by which application service provider platform 116 manages a video-based competition in accordance with one embodiment. The illustrated process can be performed, for example, by processor 120 of application service provider platform 116 through execution of program code providing video-based competition service 124.

The process of FIG. 15 begins at block 1500 and thereafter proceeds to block 1502, which illustrates application service provider platform 116 receiving a create message from an electronic communication device 102. As discussed above with reference to block 520 of FIG. 5, in some embodiments the create message may include a video clip and other inputs defining a video-based competition. In response to receipt of create message, processor 120 records information defining the video-based competition as part of competition data 268 and publishes (e.g., via feed service 256) an invitation to participate as a competitor in the video-based competition in the activity feeds of one or more users of the video-based competition platform (block 1504). An exemplary graphical user interface that may be utilized to present the activity feed is depicted in FIG. 17 and described below with reference to FIG. 16. It should be appreciated that in some embodiments or in some use cases, the users in whose activity feeds the invitation to compete is published are limited to those specified by the initiating user at block 516 of FIG. 5. In other embodiments, processor 120 may publish the invitation to participate as a competitor in the video-based competition in the activity feeds of one or more alternative or additional users of the video-based competition platform.

At block 1506, processor 120 determines whether or not the challenge to participate in the proposed video-based competition has been accepted by at least one user other than the initiating user. An exemplary process by which a user can accept the challenge to participate in a video-based competition is described below with reference to FIGS. 16 and 18. In response to a determination that the challenge to participate in the proposed video-based competition has been accepted by at least one user other than the initiating user, processor 120 causes the video-based competition, including the video clips of multiple competitors, to be published for voting in the main feeds of one or more users of the video-based competition platform, as discussed above with reference to FIG. 3 (block 1508). This publication for voting can be performed, for example, using fee service 256. It should be appreciated that in some embodiments or in some use cases, the users in whose main feeds the video-based competition is published for voting is limited to those specified by the initiating user at block 518 of FIG. 5. In other embodiments, processor 120 may publish the video-based competition in the main feeds of one or more alternative or additional users of the video-based competition platform. Following block 1508, the process of FIG. 15 passes to block 1516, which is described below.

In some embodiments or for some video-based competitions, the video-based competition is published in the main feeds of one or more users only after participation in the video-based competition as a competitor of at least one other user challenged to participate in the video-based competition. Thus, in response to a negative determination at block 1506, processor 120 determines at block 1510 to not publish the video-based competition, and the process of FIG. 15 ends at block 1518. In other embodiments or for other video-based competitions, processor 120 does not make publication of the video-based competition in the main feeds of users dependent on the participation of multiple competitors. In such cases, processor 120 determines at block 1510 to publish the video-based competition as an "open challenge." For example, an "open challenge" video competition may be published in the main feeds of one or more users with the video clip of the user that initiated the video-based competition presented in video field 304 and one or more other sub-fields of video field 304 left blank or populated by a control that enables any user viewing the video-based competition in his or her main feed to join the video-based competition as a competitor (block 1512). Any user viewing an "open challenge" can join the video-based competition as a competitor, as described further below with reference to FIG. 19.

As shown at block 1514, if the "open challenge" is not accepted by any user, the proposed video-based competition is terminated, and the process of FIG. 15 ends at block 1518. If, however, a video-based competition attracts multiple competitors, processor 120 collects and tallies votes of users to whom the video-based competition was published, publishes the result of the video-based competition after voting closes, and optionally, updates one or more leaderboards reflecting competition standings (block 1516). The actions illustrated at block 1516 can be implemented, for example, using vote tabulation and ranking service 254. Following block 1516, the process of FIG. 15 ends at block 1518.

Figure 16:
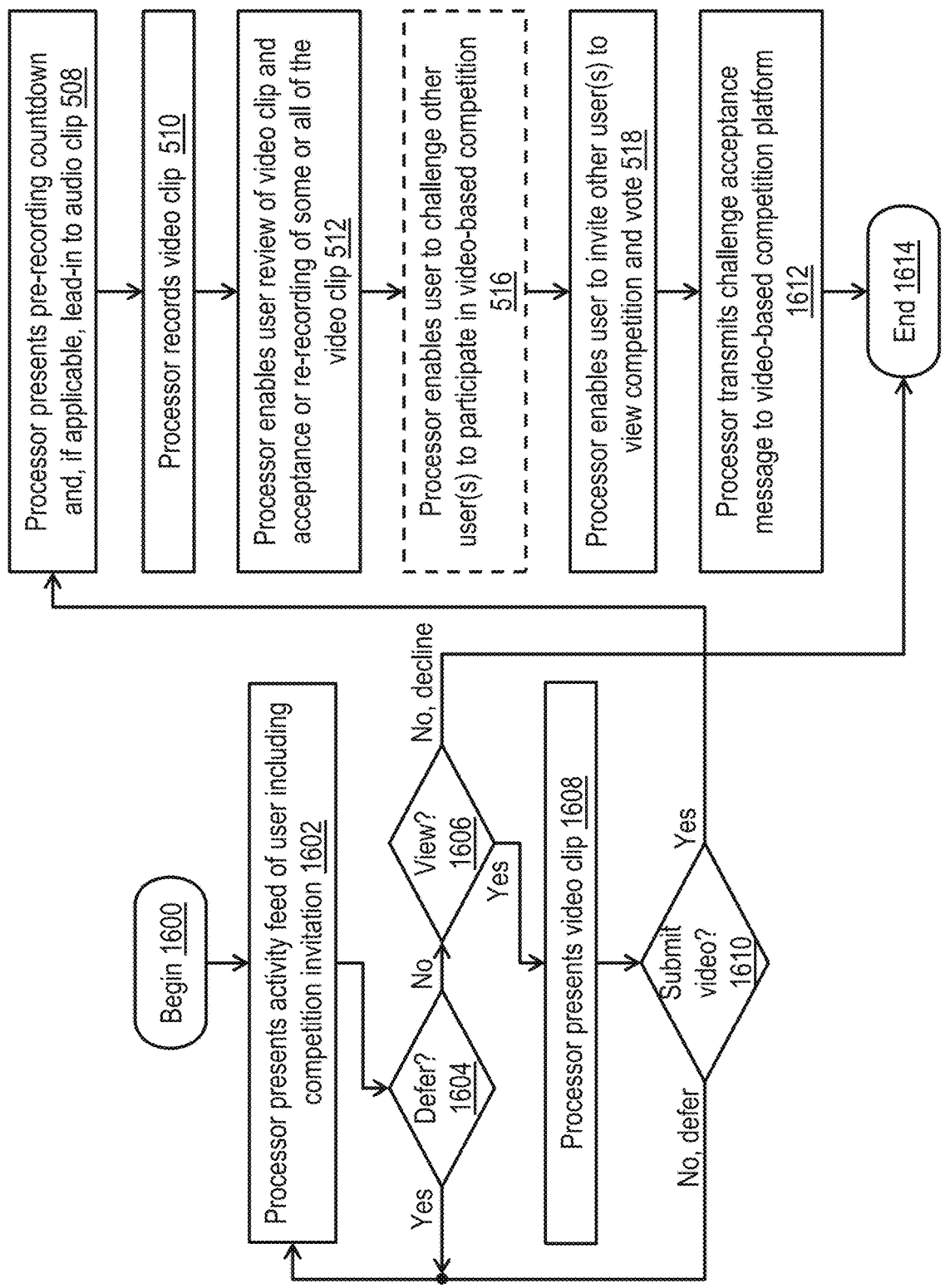
FIG. 16 is a high-level logical flowchart of an exemplary process by which a user can participate in a video-based competition as a competitor in accordance with one embodiment.
Figure 17:
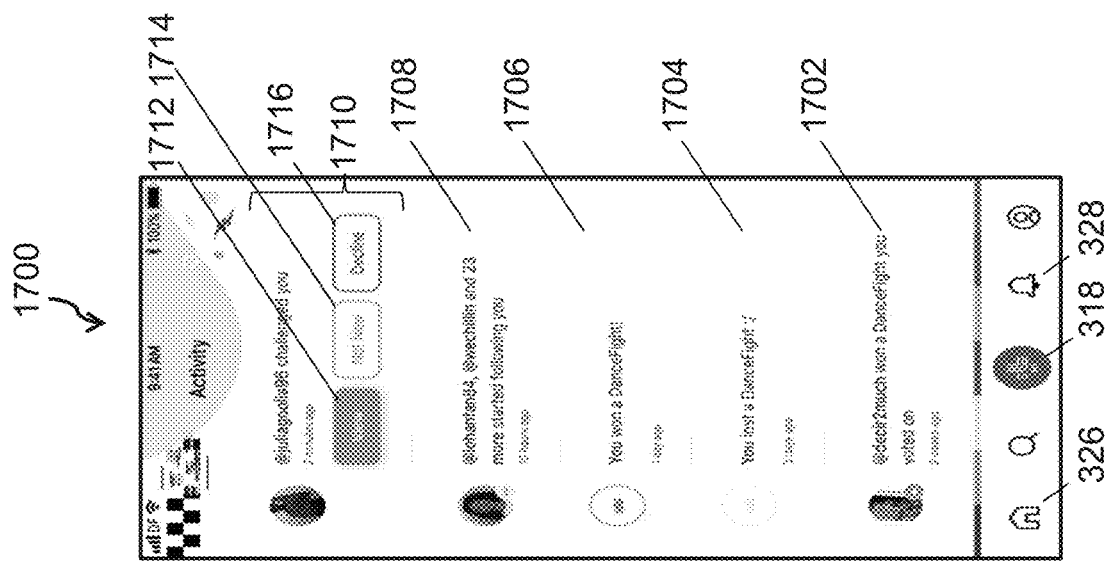
FIG. 17 illustrates an exemplary graphical user interface in which the activity feed of a user is presented in accordance with one embodiment.

Referring now to FIG. 16, there is depicted a high-level logical flowchart of an exemplary process by which a user that receives an invitation to compete in a video-based competition as a competitor can accept that challenge in accordance with one embodiment. The process of FIG. 16 can be performed, for example, by processor 200 of an electronic communication device 102 through execution of an instance of VCA 208c.

The process of FIG. 16 begins at block 1600 and then proceeds to block 1602, which depicts processor 200 presenting an activity feed of a user that includes an invitation for the user to participate in a video-based competition as a competitor. FIG. 17 illustrates an exemplary activity feed graphical user interface 1500 in accordance with one embodiment. In at least some embodiments, execution of VCA 208c by the processor 200 of an electronic communication device 102 causes the electronic communication device 102 to present activity feed graphical user interface 1500 within display device 110 in response to user selection of activity feed control 328. In some embodiments, VCA 208c causes an electronic communication device 102 to present activity feed graphical user interface 1500 within display device 110 in response to user selection of an operating system-supported activity alert, notification, or application update provided by VCA 208c.

In the depicted example, the activity feed of the user includes a plurality of activity updates 1702-1710, which are chronologically arranged in a vertically scrollable collection. Activity updates can indicate, for example, the outcome of a video-based competition that the user voted in (e.g., activity update 1702), the outcome of a video-based competition in which the user competed (e.g., activity updates 1704-1706), the addition of users as social connections within the video-based competition platform (e.g., activity update 1708), video-based competitions that the user has been invited to view and vote in (not specifically illustrated), and video-based competitions that the user has been challenged to participate in as a competitor (e.g., activity update 1710).

In the embodiment depicted in FIG. 17, VCA 208c enables a user to launch a process for viewing and voting in a video-based competition or to launch a process for participating in a video-based competition as a competitor from the user's activity feed. For example, activity feed graphical user interface 1700 of FIG. 17 includes within activity update 1710 a view control 1712 that, when selected, causes VCA 208c to present a graphical user interface in which the user can view details regarding a video-based competition in which the user has been challenged to participate as a competitor. Activity update 1710 may optionally additionally include a defer control 1714 that, when selected by the user, causes VCA 208c to maintain the proposed video-based competition in a draft state (assuming a 1-on-1 competition) for up to a programmable maximum amount of time. Deferring a decision about participation in the video-based competition also causes VCA 208c to retain activity update 1710 with an active view control 1712 in the user's activity feed. Activity update 1710 may optionally additionally include a decline control 1716 that, when selected by the user, causes VCA 208c (assuming a 1-on-1 competition) to update the proposed video-based competition to a closed state, and to modify activity update 1710 (and the activity update of the user that initiated the video-based competition) to indicate that the proposed video-based competition was declined (e.g., "You declined a DanceFight with @juliagoolia96" in the activity feed of the user invited to participate as a competitor or "@juliagoolia96 declined a DanceFight with you" in the activity feed of the user that initiated the video-based competition).

Referring again to FIG. 16, if processor 200 receives at block 1604 a user input indicating that the user desires to defer participation in a video-based competition in which the user has been challenged to participate as a competitor (e.g., selection of defer control 1714), the process of FIG. 16 returns to block 1602, which has been described. If, however, processor 200 detects at block 1606 a user input indicating that the user declines participation in the video-based competition, processor 200 updates the activity feed of the user accordingly, and the process of FIG. 16 ends at block 1622. If processor 200 instead determines at block 1606 that a user input is received requesting viewing of the video-based competition in which the user has been challenged to participate, the process passes to block 1608, which illustrates processor 200 presenting a competitive video clip (e.g., a video clip submitted by the user that initiated the video-based competition) (block 1608). In one exemplary embodiment, the competitive video clip can be presented as shown in FIG. 18.

Figure 18:
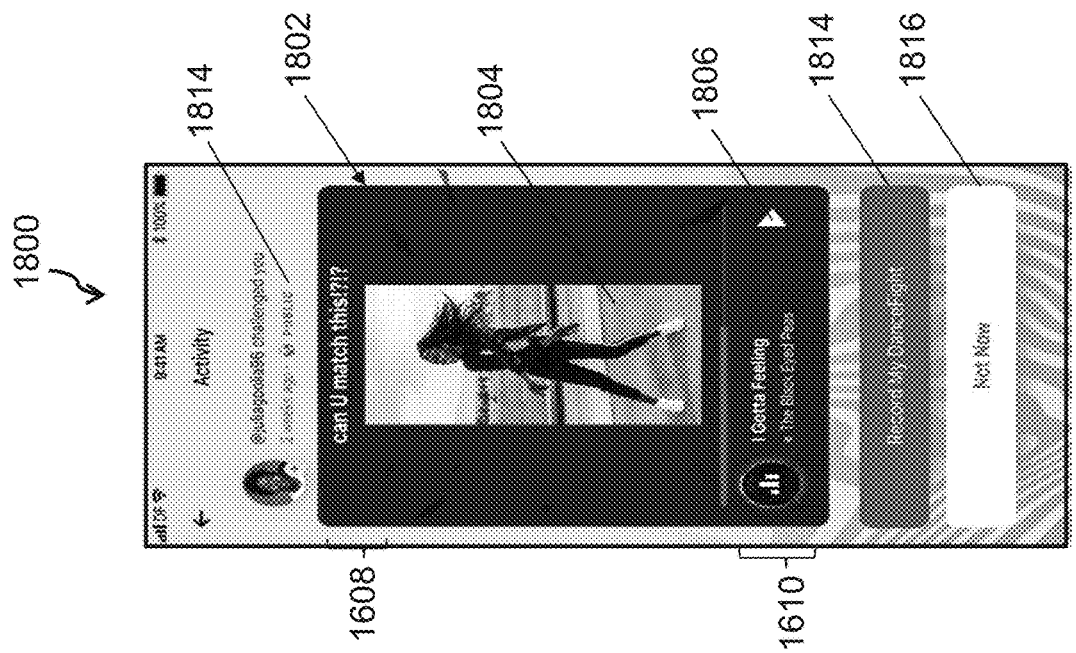
FIG. 18 depicts an exemplary graphical user interface through which a user is challenged to compete in a video-based competition in one embodiment.

Referring now to FIG. 18, there is depicted an exemplary graphical user interface 1800 through which a user can participate in a video-based competition in which the user has been invited to participate as a competitor. Graphical user interface 1800, which may be presented within the activity feed of the user, includes a challenge summary 1802 including a video field 1804 in which the user can view the video clip submitted by the user that initiated the video-based competition, for example, in response to user selection of play control 1806. An audio clip, if merged into and/or associated with the video clip, is audibly presented in synchrony with the presentation of the video clip. In this example, challenge summary 1802 also optionally includes a message field 1808 that presents a message from the initiating user and a track identifier 1810 that identifies (e.g., by song title and artist) the audio track from which the audio clip was taken. The challenge summary 1802 and/or graphical user interface 1800 may optionally include other information regarding the video-based competition, such as whether the video-based competition is public or private (see, e.g., public/private notation 1814), the competition's title, and/or the competition description.

Graphical user interface 1800 additionally preferably includes at least an acceptance control 1814 that, if selected by the user, causes VCA 208c to initiate a process by which the user can record and/or submit a video clip for inclusion in the video-based competition. In the exemplary embodiment given in FIG. 18, VCA 208c additionally includes a delay control 1616 that, when selected by the user, causes VCA 208c to maintain the proposed video-based competition in a draft state (assuming a 1-on-1 competition) for up to a programmable maximum amount of time and to retain the associated activity update within the user's activity feed as shown in FIG. 17.

Returning to block 1610 of FIG. 16, if processor 200 detects that the user has elected to defer participation in the video-based competition (e.g., as indicated by selection of delay control 1816), the process of FIG. 16 passes to block 1602, which has been described. If, however, processor 200 determines at block 1610 that an input indicating the user desires to submit a video in the video-based competition has been received (e.g., selection of acceptance control 1814), in some embodiments processor performs the steps previously described with reference to blocks 508, 510, 512, 516 (optional), and 518 of FIG. 5. Because these steps are described in detail above, these steps will not be described further here.

Referring now to block 1612 of FIG. 16, processor 200, following acceptance of the challenge for the user to participate in the video-based competition, transmits a challenge acceptance message to application service provider platform 116. The challenge acceptance message includes, for example, the video clip submitted by the user and the identities of the other user(s) to be challenged to participate in the competition as competitors and/or invited to vote in the competition. Following block 1612, the process of FIG. 16 ends at block 1614.

In accordance with some embodiments, such as that depicted in FIG. 3, a user is permitted not only to create or initiate video-based competitions, but also to "join" video-based competitions created by others which the user has not been invited to participate in as a competitor. As noted above, VCA 208c and/or application service provider platform 116 can provide this functionality in response to user selection of join control 320. (The following discussion will describe the "join" functionality as being provided by VCA 208c executing on a processor 200 of an electronic communication device 102 for ease of discussion.)

Figure 19:
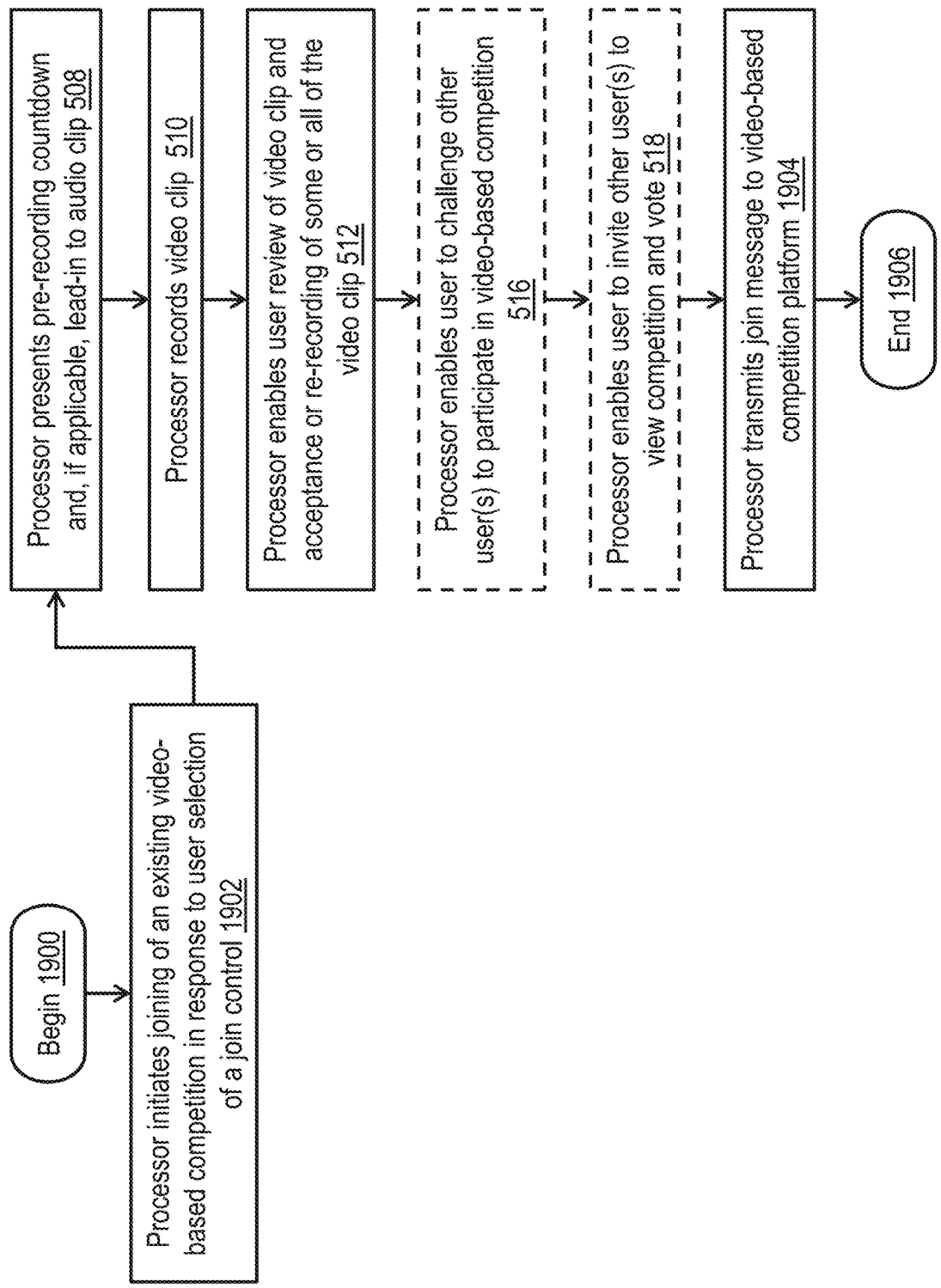
FIG. 19 is a high-level logical flowchart of an exemplary process by which a user can join an existing video-based competition as a competitor in accordance with one embodiment.

With reference now to FIG. 19, there is illustrated a high-level logical flowchart of an exemplary process by which a user can join an existing video-based competition as a competitor in accordance with one embodiment. The process of FIG. 19 begins at block 1900 in response to detection by the processor 200 of an electronic communication device 102 of an input indicating that the user desires to join an existing video-based competition, for example, viewed in a pane 302 in the main feed presented in graphical user interface 300. As noted above, this input can be user selection of join control 320. The process then proceeds to block 1902, which depicts processor 200 initiating a process by which the user can join the existing video-based competition (if permitted).

In at least some embodiments, a user joining an existing video-based competition in which the video clip is synchronized to a time base and/or audio clip will capture their own video clip that will also be synchronized to the same time base and/or audio clip. In at least some embodiments, all video-based competitions spawned by users through "joining" an existing video-based competition share the same title as the original video-based competition from which it was spawned. Consequently, in response to selection of join control 320, processor 200 can immediately perform the steps depicted at block 508, 510, 512, 516 (optional), and 518 (optional). Because these steps are described in detail above, a further description is not provided here. It should be appreciated that in some embodiments, the steps performed at blocks 508, 510, 512, 516 (if present), and 518 (if present) can be performed in a different order than illustrated. For example, a processor performing a join process may first allow the user to challenge other user(s) to participate as competitors in the video-based competition (as depicted in block 516) prior to performing the steps shown in blocks 508, 510, 512, and 518.

Referring now to block 1914 of FIG. 19, processor 200 transmits a join message to the video-based competition platform via communication network(s) 104. The join message includes, for example, the video clip submitted by the user and the identities of the other user(s), if any, to be challenged to participate in the competition as competitors and/or invited to vote in the competition. Following block 1904, the process of FIG. 19 ends at block 1906.

Figure 20:
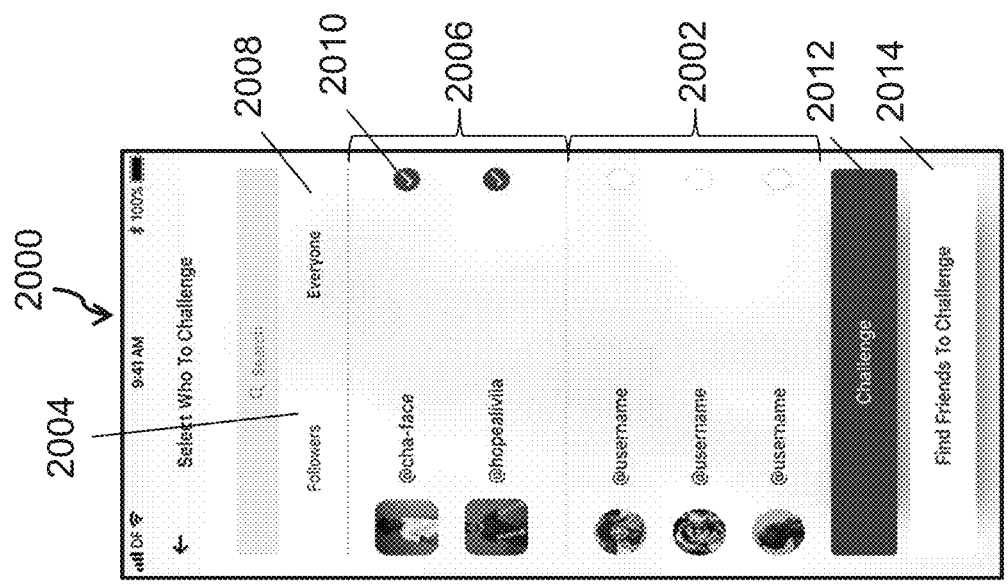
FIG. 20 illustrates an exemplary challenge graphical user interface through which a user wishing to join an existing video-based competition can challenge one or more other users to compete in the video-based competition.

Referring now to FIG. 20, there is depicted an exemplary challenge graphical user interface 2000 that may be employed at optional block 516 of FIG. 19. In the depicted example, which is constructed similarly to challenge graphical user interface 1300 of FIG. 13, VCA 208c presents, by default or in response to selection of first list control 2004, a first list 2002 of other users of the video-based competition platform accessible via VCA 208c that are "friends" or "followers" or "connections" or "contacts" of the user either on-platform or off-platform (e.g., having contact information stored in contact management application 208f or having a social connection with the user via a third-party social media platform). This first list 2002 can be prefaced or supplemented by an existing competitor list 2006 listing two or more existing competitors of the video-based competition (which in some embodiments are selected by default). VCA 208c may further present for selection (e.g., in response to user selection of second list control 2008) a second list including all users or users of the video-based competition platform with which the user of VCA 208c is not currently connected. The user can select one or more users from the competitor list, the first list, and/or the second list, for example, by tapping on the associated check box(es) 2010.

Once the user has selected one or more users from the first and/or second lists, the user confirms completion of the selection of users to be challenged to compete in a video-based competition via selection of challenge control 2012. In the embodiment of FIG. 20, VCA 208c additionally enables the user to invite contacts from off of the video-based competition platform (e.g., having email or phone contact information in contact management application 208f or having a social connection with the user via a third-party social media platform) to join the video-based competition platform and participate as a competitor in the video-based competition via find friends control 2014. These off-platform invitations can be communicated, for example, via text messaging, email, and/or social media messages. In response to user selection of challenge control 2012, VCA 208c communicates the challenge to the challenged user(s) via their activity feeds, as described above.

Referring now to FIGS. 21A-21C, there are depicted multiple time-sequenced views of a same graphical user interface 300 that provide an animation of a user's voting process for a video-based competition in accordance with one embodiment. As described above with reference to FIG. 3, a video-based competition in which a user is invited to vote (or permitted to vote) is presented within a vertically scrollable collection of panes 302 within the main feed of the user. As the user retains a given pane 302 in the display device 110, all of the multiple video clips in video field 304 (including at least two video clips 306a, 306b, but optionally including additional video clips of other users) are initially played in conjunction, each in a continuous loop. If the video-based competition is synchronized to an audio track, the audio track is also audibly presented in a continuous loop. (As noted above, it is preferred in at least some embodiments for the video clips to be concurrently presented in independently controllable video players and for the user to be able to independently control playback of each video clip presented in video field 304.)

While the user is viewing the video-based competition in pane 302, VCA 208c can capture the user's vote based upon one or more user inputs. For example, in some embodiments, VCA 208c may receive a vote for or against a competitor based on a tap, double-tap, or swiping gesture. For example, FIGS. 21A-21C illustrate an example in which the user casts a vote for second video 306b (and/or against first video 306a) by touching a "handle" icon 2100 at the boundary of first video 306a and second video 306b (e.g., the "VS") and then swiping to the left. Of course, the user could alternatively cast his or her vote for first video 306a by touching "handle" icon 2100 and then swiping to the right.

In at least some embodiments, VCA 208c does not immediately record a vote based on the initial detection that the user has initiated the voting gesture. Instead, as the user's tentative preference is being expressed by the progress of the voting gesture, VCA 208c provides a graphical indication of the detection of the tentative preference, for example, by presenting video noise (colloquially referred to as digital "snow" or "static") in place of the video clip that the user is voting against and by modifying handle icon 2100 to indicate a voting action has been detected (e.g., by changing the "VS" into a checkmark). In addition, VCA 208c optionally but preferably decreases the screen area allocated to the video clip being voted against and increases a size of one or more remaining video clips within video field 304. Depending on the form factor of display device 110 and the number of remaining video clips, increasing a size of the one or more remaining video clips being played can have the effect of "zooming" in on the remaining video clip(s), as can be seen by comparison of the views provided in FIGS. 21A-21C. After the voting gesture is detected, the user may still change his or her mind and vote for a different video clip than was initially tentatively selected. However, as the user's initially expressed voting intent is confirmed (e.g., by continuation of the voting gesture for a threshold time and/or threshold linear distance), VCA 208c may provide an indication of completion of the vote, for example, by removing from video field 304 the video clip(s) that was/were voted against and/or providing an indication of the user's vote for the last remaining video clip, such as a haptic response, an audio tone, and/or a graphical indication (e.g., check mark 2102). After the user's vote is cast, VCA 208c preferably causes its electronic communication device 102 to report the vote to vote tabulation and ranking service 254 to permit a winner of the video-based competition to be determined (e.g., by tallying the vote with those of other voters in the video-based competition, if any) and to permit the competition result to be published by the video-based competition platform to the activity feeds of one or more users.

Figure 22C:
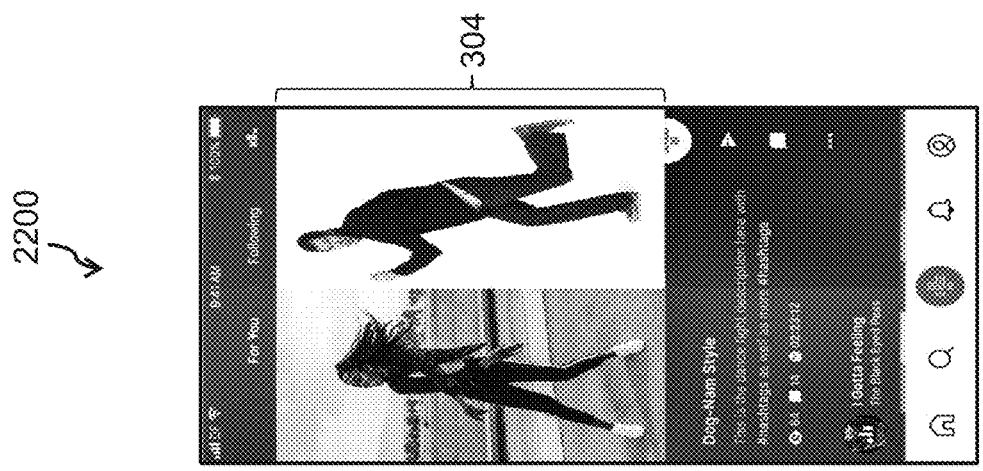
FIGS. 22A-22C illustrate an animation of a voting process in a video-based competition between more than two competitors in accordance with one embodiment.
Figure 22B:
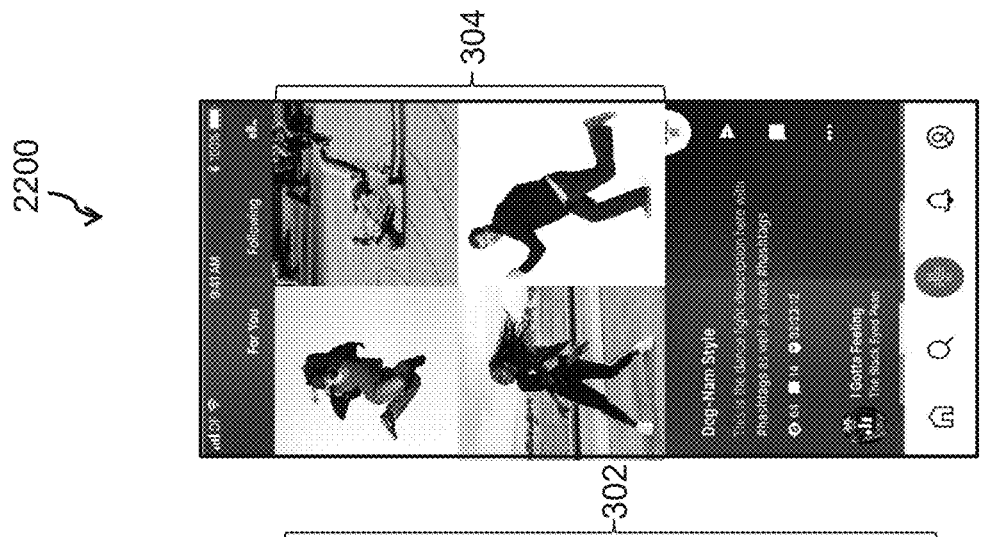
Figure 22A:
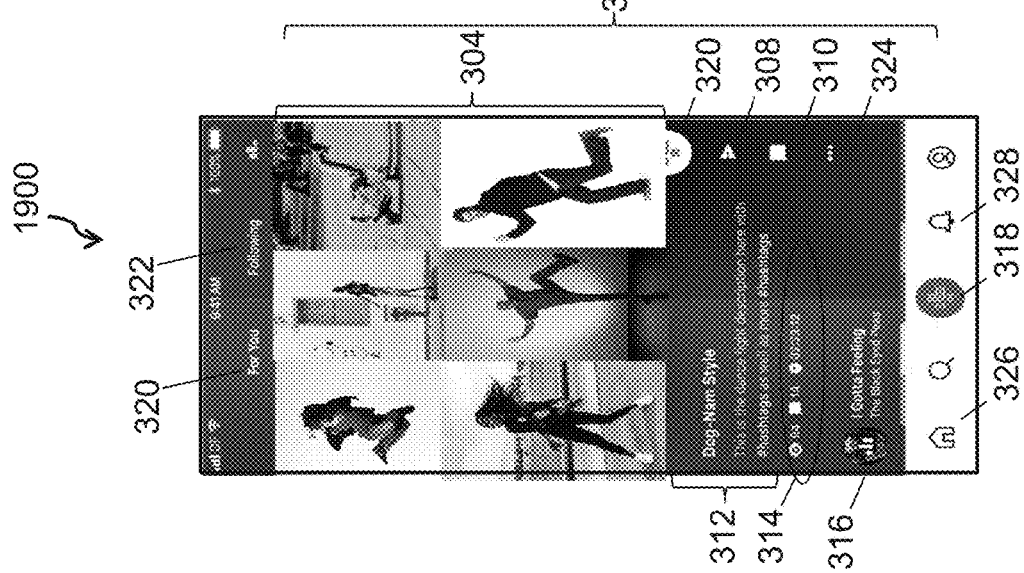

With reference now to FIGS. 22A-22C, there are depicted multiple time-sequenced views of a graphical user interface 2200 that provide an animation of an exemplary process of voting in a video-based competition having more than two competitors in accordance with one embodiment. In FIG. 22A, video clips of six competitors are played simultaneously by six video players within video field 304 (and, if the video clips are synchronized with a time base or audio clip, are played in synchrony). As the voter evaluates the video clips, VCA 208c preferably provides features to facilitate comparison of the video clips, for example, by enabling the voter to enlarge, reveal related/tagged information associated with each video clip, and/or bring multiple videos to the foreground to compare side-by-side. As discussed above with reference to FIGS. 21A-21C, VCA 208c preferably permits a user to vote for or rank order one or more video clips (and/or eliminate other video clips from consideration) utilizing one or more user inputs, such as a tap, double-tap, and/or swipe gesture.

In some embodiments, such as that illustrated in FIGS. 22A-22C, VCA 208c removes from video field 304 video clips that are eliminated (i.e., voted against) or assigned less than the $1^{st}$ rank by the user. Thus, FIG. 22B illustrates video field 304 of graphical user interface 1900 following elimination of (or assignment of $5^{th}$ and $6^{th}$ place to) two of the video clips initially presented in video field 304 in FIG. 22A. FIG. 22C shows video field 304 following elimination of (or assignment of $3^{rd}$ and $4^{th}$ place to) two additional video clips from the video field 304 shown in FIG. 22B. In other embodiments, VCA 208c may continue to present video clips within video field 304 that are eliminated (or ranked lower than $1^{st}$), but are preferably updated with a graphical indication of their eliminated (or ranked) status.

Figure 23:
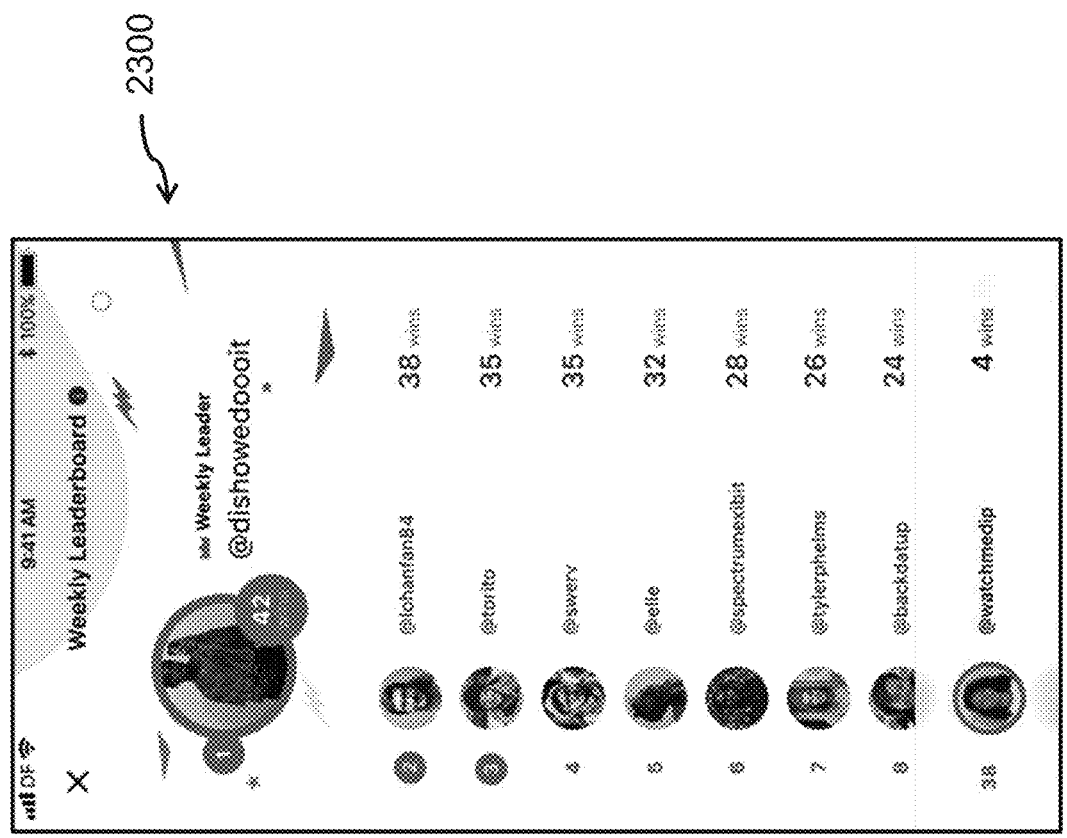
FIG. 23 depicts an exemplary leaderboard graphical user interface that can be presented by a video-based competition application in one embodiment.

The video-based competition platform provided by application service provider platform 116 can determine and report competition standings between users via vote tabulation and ranking service 254 and the instances of VCA 208c executing on the various electronic communication devices 102. For example, in some embodiments, an instance of VCA 208c can present a leaderboard based on a default or user-selected time period (e.g., the prior week, month, year, or all-time) and/or a default or user-selected geographical boundary (e.g., postal code, city, county, state, nation, or world) and/or other user grouping (e.g., school, club affiliation, competitor skill level, audio track used in the competition, etc.). FIG. 23 illustrates an exemplary leaderboard graphical user interface 2300 that can be presented by VCA 208c, for example, in response to user selection of a leaderboard control exposed in response to user selection of options control 324 of graphical user interface 300. In this example, leaderboard graphical user interface 2300 presents users in rank order of number of competition wins achieved in the past seven days. The user (i.e., @watchmedip) viewing the leaderboard can easily see her place in the rankings (i.e., $38^{th}$ place). In other embodiments, application service provider platform 116 can determine and report competition standings based on other or additional factors than competition wins, including, for example, win-loss percentage, number of views of the video-based competition by other users, number of aggregate votes received for the user, number of competitions entered, etc.

In some embodiments, the set of users that a user is allowed to challenge to a video-based competition can be constrained based upon competition standings as determined by the video-based competition platform. For example, a user may be required to achieve a threshold ranking in the user's "home" geographical boundary or user grouping before being permitted to challenge users outside of the user's geographical boundary or user grouping to a video-based competition. As another example, a user's selection of one or more other users to challenge to compete in a video-based competition may alternatively or additionally be constrained to those within a predetermined range of the user's current ranking. As a specific example, the video-based competition platform may implement "King of the Hill" rankings for one or more leaderboards, meaning that once a user ranks in the top N (e.g., 10) users on a given leaderboard, the video-based competition platform enables a user to only challenge the user ranked directly above him or her in the rankings. At the conclusion of the video-based competition (or in some embodiments, if the next higher ranked user fails to accept the challenge within a predetermined time period), the winner of the video-based competition moves up one rank on the leaderboard, and loser drops down one rank. These ranking updates are reflected in user ranking data 270.

Figures 24, 25, 26:
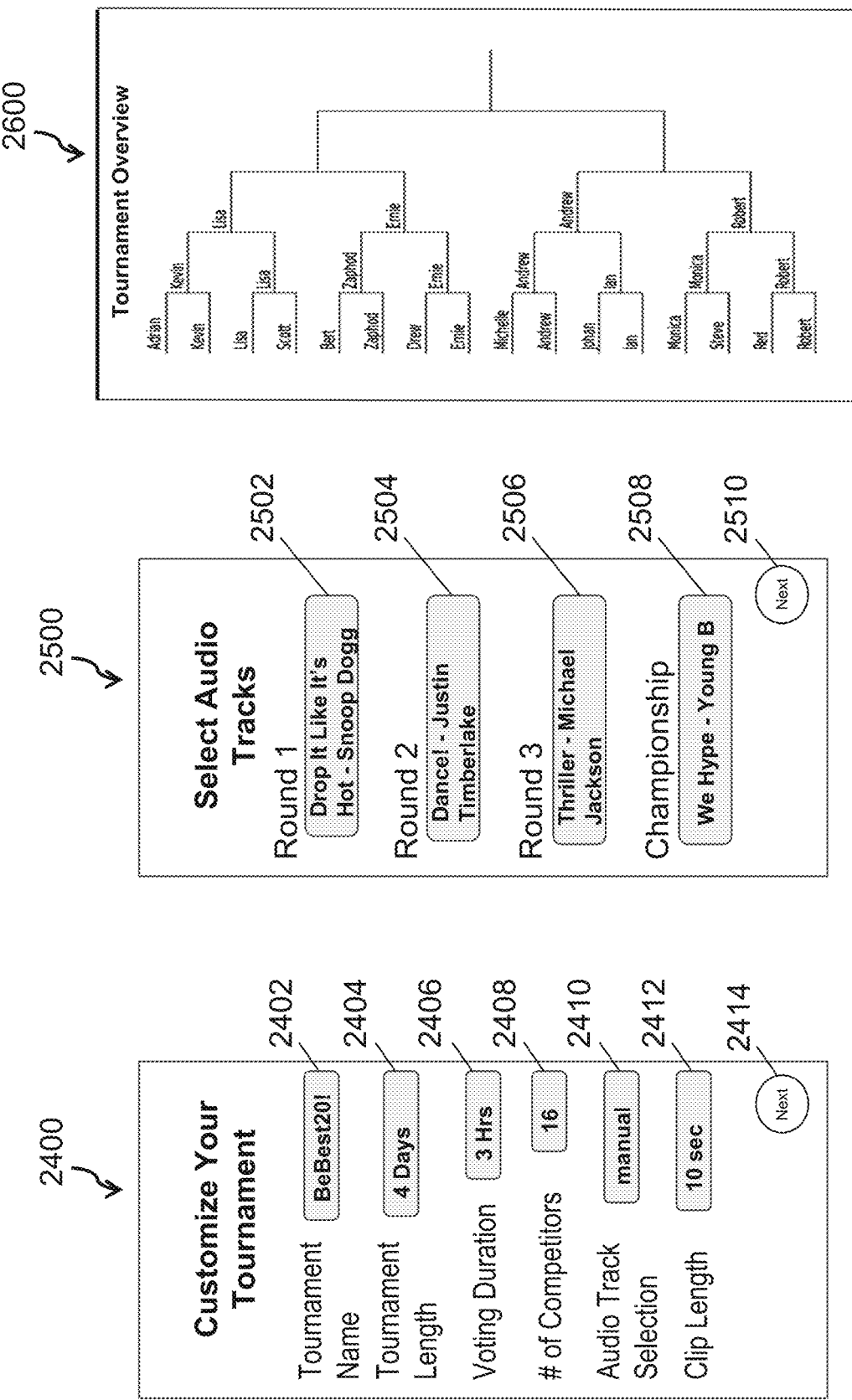
FIGS. 24-26 illustrate graphical user interfaces through which a user can create and view a tournament of video-based competitions in one embodiment.

In some embodiments, the video-based competition platform described herein supports user creation of not only individual video-based competitions, but also user creation (or platform creation) of multiple video-based competitions sequenced to form a bracket-style tournament (e.g., a single-elimination or double-elimination tournament). For example, in some embodiments, VCA 208c provides a tournament control (e.g., exposed in response to user selection of options control 324 of graphical user interface 300) that, when selected by a user serving as the tournament sponsor, enables the tournament sponsor to create a tournament. FIG. 24 illustrates an exemplary embodiment of a tournament configuration graphical user interface 2400 that VCA 208c may present to the tournament sponsor in response to selection of the tournament control. In this example, the tournament sponsor is permitted to establish a tournament and configure parameters of the tournament by supplying tournament details in tournament data fields 2402-2412, such as the tournament name, tournament duration, voting duration per competition, number of tournament participants, manual (user) selection or automatic (platform) selection of audio tracks, and video clip duration.

In some embodiments, in response to user selection of manual selection of audio tracks, following user selection of next control 2414 VCA 208c presents a graphical user interface through which the user can select audio tracks for the various rounds of the tournament. For example, FIG. 25 depicts an exemplary track selection graphical user interface 2500 that permits the user to specify through text entry in track fields 2502-2508 an audio track for each round of the tournament. (Of course, in other embodiments, other modalities of audio track selection can alternatively or additionally be employed.) Following creation of the tournament by the tournament sponsor (and optionally, in response to selection of next control 2210), VCA 208c preferably enables the tournament sponsor to invite users to compete in the tournament and/or to view and vote in the tournament, as has previously been described. In some embodiments, VCA 208c may additionally provide a control that permits users competing in, voting in, and/or viewing competitions in the tournament to view a tournament overview detailing the competitive pairings in each round of the tournament. One exemplary tournament overview is depicted in graphical user interface 2600 of FIG. 26.

In some embodiments, the video-based competition platform may additionally support team competitions in which multiple users forming a team/group/tribe are tasked with completing certain video-based competition(s). Collective completion of all the video-based competition(s) by all team members and/or the ranked performance of the team as a whole for the video-based competition(s) enables all team members to be rewarded and/or to advance into additional competitive opportunities.

In some embodiments, the video-based competition platform described herein can be utilized to host reality competitions for dancing, singing, and other activities. In some embodiments, the video-based competition platform supports appointment viewing in which users login for "hosted" shows, which the users can view and/or vote in and/or participate in as competitors. In a "hosted" show, each user participating as a competitor captures his or her respective video clip "live" at the same time as other users competing in the "hosted" show via his or her instance of VCA 208c. The "hosted" show may also support user viewing of pre-recorded profile videos of the competitors, giving viewers a glimpse into the competitors' everyday lives. In some embodiments, the video-based competition platform can require that all votes be cast during the live show (and/or during a brief period thereafter). Multiple hosted shows of this type can be sequenced to form a show "season" in which one or more of the competitors appears in serial shows and other competitors are eliminated.

Figure 27:
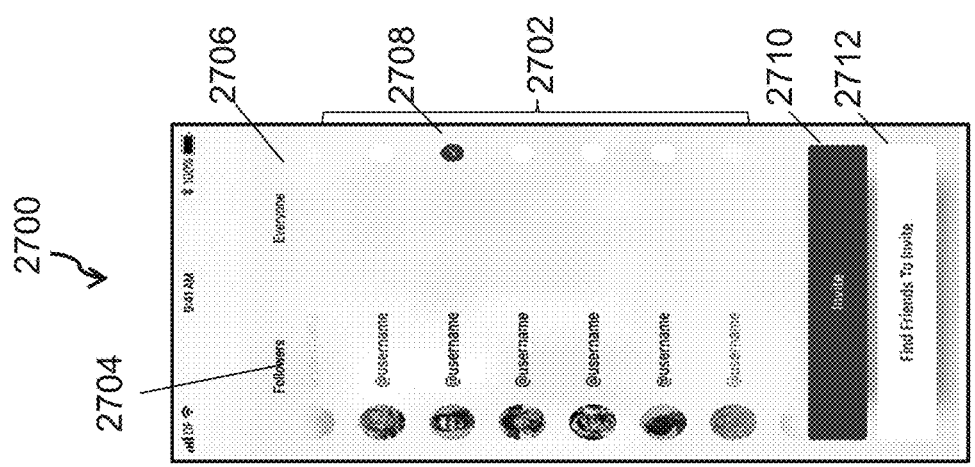
FIG. 27 depicts a graphical user interface that can be utilized by a user to create and compete in a collaborative video-based competition in one embodiment.

In at least some embodiments, the video-based competition platform supports the distributed collaboration of multiple users in creating a single video clip. For example, in one embodiment, the process of creating a video-based competition as generally described above with reference to FIG. 5 includes VCA 208c providing a control that, when selected by the user in the configuration performed at block 506, enables the user to invite other users to collaborate in creating a video clip. In this example, if the collaboration option is selected at block 506, VCA 208c may present a graphical user interface 2700 as depicted in FIG. 27.

In the depicted example, which is constructed similarly to challenge graphical user interface 1300 of FIG. 13, VCA 208c presents, by default or in response to selection of first list control 2704, a first list 2702 of other users of the video-based competition platform accessible via VCA 208c that are "friends" or "followers" or "connections" or "contacts" of the user either on-platform or off-platform (e.g., having contact information stored in contact management application 208f or having a social connection with the user via a third-party social media platform). VCA 208c may further present for selection (e.g., in response to user selection of second list control 2706) a second list including all users or users of the video-based competition platform with which the user of VCA 208c is not currently connected. The user can select one or more users from the first list and/or the second list, for example, by tapping on the associated check box(es) 2708.

Once the user has selected one or more users from the first and/or second lists, the user confirms completion of the selection of users to be invited to collaborate in the creation of a video clip for a video-based competition via selection of invite control 2710. In the embodiment of FIG. 27, VCA 208c additionally enables the user to invite contacts from off of the video-based competition platform (e.g., having email or phone contact information in contact management application 208f or having a social connection with the user via a third-party social media platform) to join the video-based competition platform and participate as a collaborated in creating a video clip for a video-based competition via find friends control 2712. These off-platform invitations can be communicated, for example, via text messaging, email, and/or social media messages. In response to user selection of invite control 2710, VCA 208c communicates the challenge to the invited user(s) via their activity feeds, as described above.

Each user accepting the invitation to collaborate in the creation of the video clip then records a segment of the video clip, where each such segment can be of user-selected or platform-determined (e.g., equal) length. The process and graphical user interfaces employed for recording the segments of the video clip can be, for example, as described above with reference to block 510 of FIG. 5 and with additional reference to FIGS. 8-11. Once all of the video segments are captured by the various collaborating users on one or a plurality of electronic communication devices 102, the video-based competition platform optionally but preferably automatically stitches together the video segments and merges them to form one single continuous video clip. Each collaborating user is also preferably able to challenge users to compete in the video-based competition and/or to invite users to view and vote in the video-based competition, as described above with reference to blocks 516-518 of FIG. 5 with additional reference to FIGS. 13-14. An accepted challenge to the video-based competition causes the video-based competition platform to publish the video-based competition, for example, to the main feeds of each of the users accepting the invitation to vote in the video-based competition, as described above and as illustrated in FIG. 3.

Figure 28:
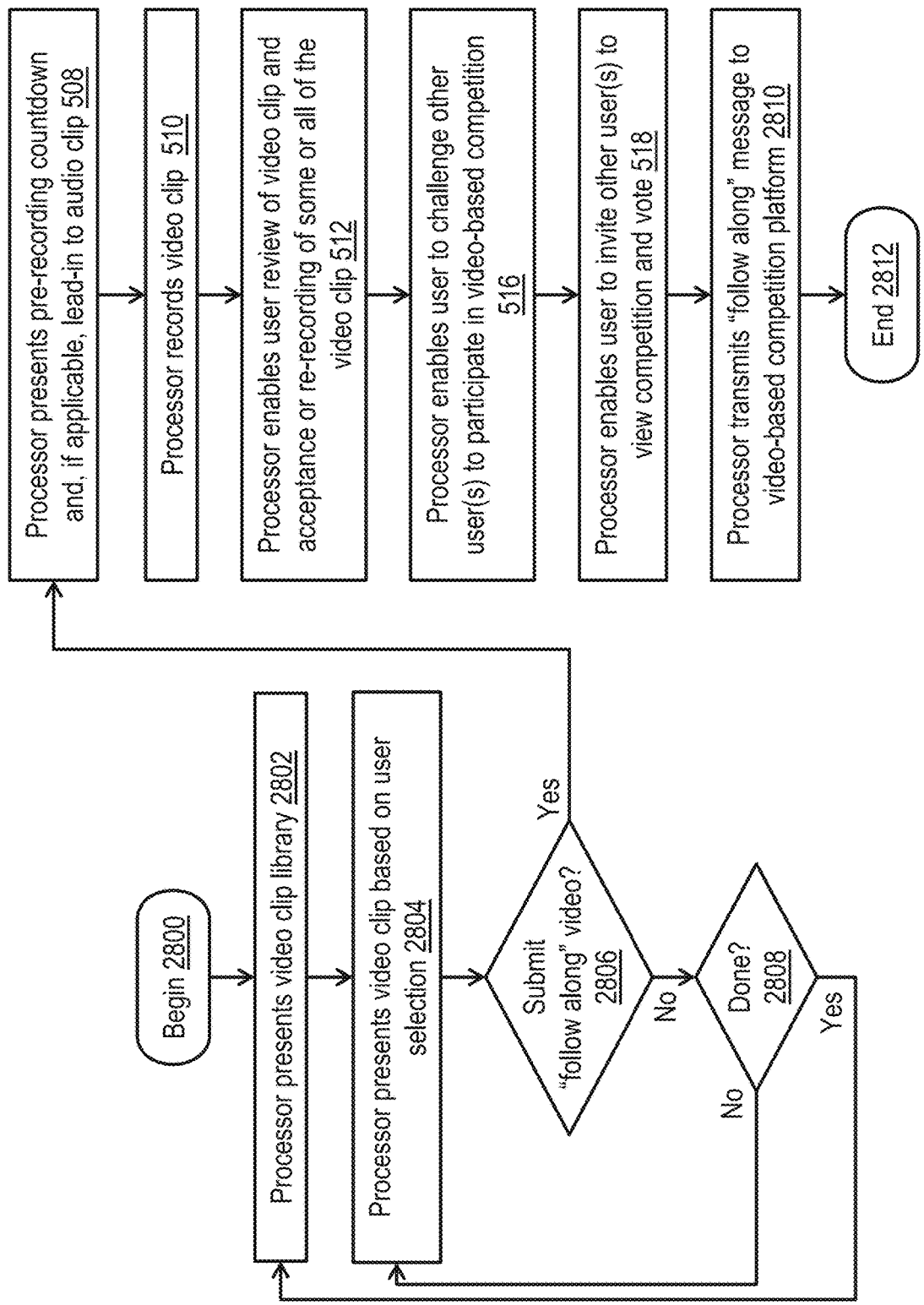
FIG. 28 is a high-level logical flowchart of an exemplary process by which a user can participate as a competitor in a "follow along" video-based competition in accordance with one embodiment.

In at least some embodiments, the video-based competition platform supports yet another type of video-based competition referred to herein as a "follow along" competition. In such competitions, a user views a model video clip of an activity (e.g., a dance move, etc.) and then submits the user's own video clip of the depicted activity. Referring now to FIG. 28, there is depicted a high-level logical flowchart of an exemplary process by which a user can participate as a competitor in a "follow along" video-based competition in accordance with one embodiment. The illustrated process can be performed, for example, by a processor 200 of an electronic communication device 102 through execution of VCA 208*c*.

Figures 29, 30, 31:
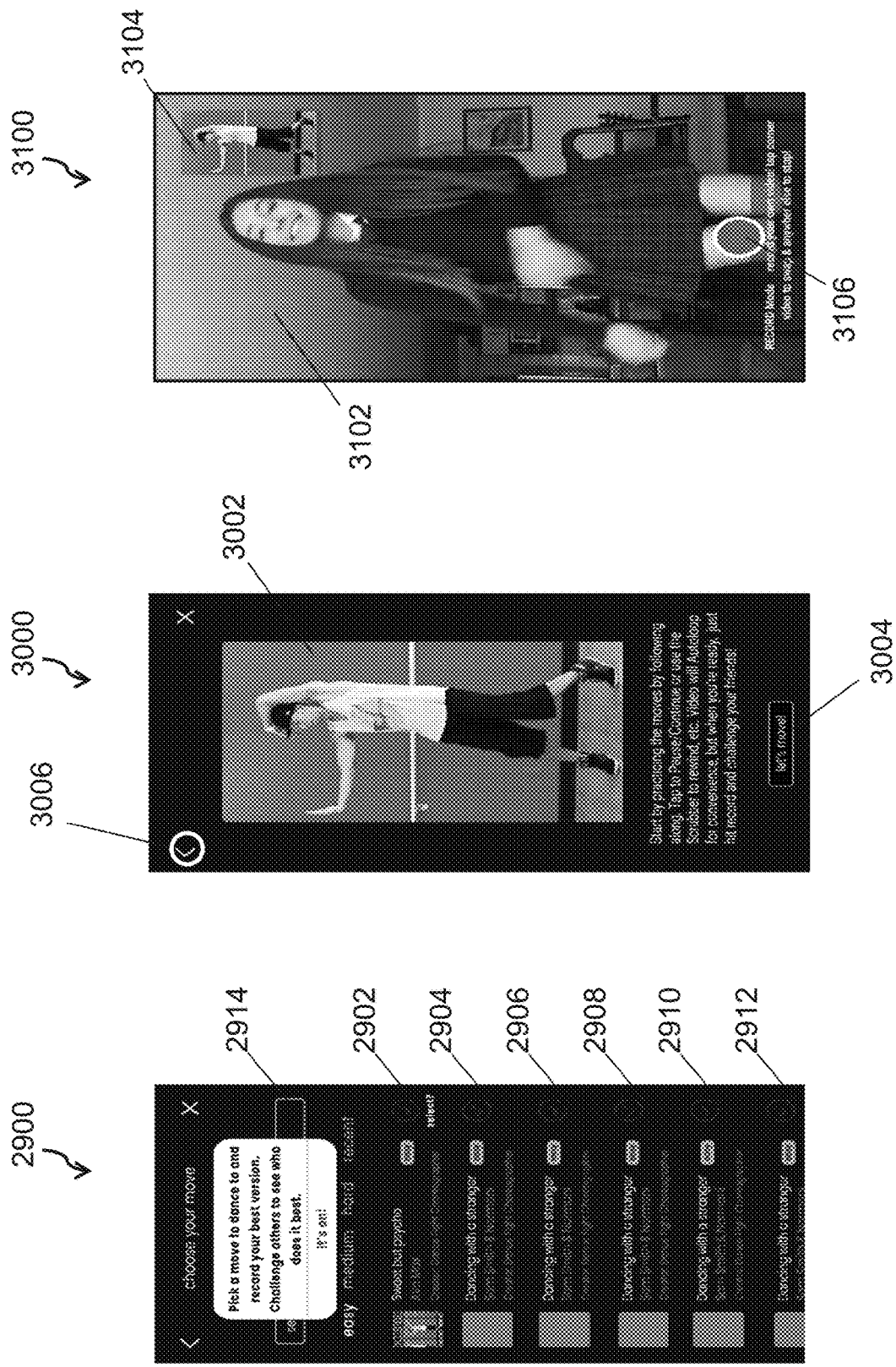
FIGS. 29-31 illustrate graphical user interfaces through which a user can create and compete in a "follow along" video-based competition in accordance with one embodiment.

The process of FIG. 28 begins at block 2800, for example, in response to processor 200 detecting user selection of a video clip library control, which can be exposed to the user, for example, in response to user selection of options control 324. The process proceeds from block 2800 to block 2802, which illustrates processor 200 presenting contents of a video clip library to the user via display 110. For example, in some embodiments, processor 200 may present the video clip library to the user via a video clip library graphical user interface 2900 as shown in FIG. 29. In this example, video clip library graphical user interface 2900 permits the user to browse (e.g., scroll) through the video clips associated with library entries including library entries 2902-2912 (which in the illustrated embodiment are video clips of dance moves). The video clips associated with library entries 2902-2912 may be stored, for example, at application service provider platform 116 as video clip library 290 and/or locally at the user's electronic communication device 102. The video clips populating the video clip library or libraries may be supplied by the video-based platform provider and/or its third-party partners and/or users of the video-based competition platform. As further illustrated in FIG. 29, video clip library graphical user interface 2900 may optionally include a textual search box 2914 in which the user can search (e.g., by title, subject, performer, audio track, video clip length, dance move or activity name, etc.) for video clip(s) responsive to a user-specified textual search string. In this manner, the library entries 2902-2912 presented within video clip library graphical user interface 2900 may be selectively filtered.

In response to processor 200 detecting user selection of one of library entries 2902-2912 of video clip library graphical user interface 2900, the process of FIG. 28 proceeds from block 2802 to block 2804, which illustrates processor 200 presenting the video clip corresponding to the selected library entry via display device 110 (block 2804). For example, in one exemplary embodiment, processor 200 may present the video clip to the user via a graphical user interface, such as graphical user interface 3000 of FIG. 30. In this example, processor 200 plays the video clip associated with the selected library entry within a video field 3002 in a continuous loop (and if relevant, also audibly presents an associated audio clip). As will be appreciated, the video clip, which may include, for example, one or more of camera-captured video, animation, rendering, open captions, audio (possibly including music and/or verbal instructions), may feature a dance move, a vocal performance, a sport trick shot, an animation, or any other skill, exhibition, or action serving as a model for the user to imitate. The user may optionally use unillustrated playback controls to play, pause, frame advance, and/or reverse play the video clip one or more times in order to practice the activity based on the model provided by the video clip.

As depicted at blocks 2806 and 2808 of FIG. 28, processor 200 may detect whether an input has been received indicating the user desires to either to record a video clip based on the model provided by the viewed video clip (e.g., user selection of next control 3004) or to return to the video clip library (e.g., user selection of back array 3006). In response to processor 200 detecting an input indicating the user desires to return to the video clip library, the process of FIG. 28 returns from block 2808 to block 2802, which has been described. If, however, processor 200 detects an input indicating the user desires to record a video clip based on the model video clip, the process of FIG. 28 proceeds from block 2806 to block 508, 510, 512, 516, and 518, which can be implemented substantially as described above.

In at least some embodiments, however, the recording graphical user interface utilized to capture the user's video clip can be augmented to include the model video clip in order to facilitate the user successfully copying the model video clip. For example, FIG. 31 illustrates an exemplary recording graphical user interface 3100 that may be employed at block 510 of FIG. 28. In this example, recording graphical user interface 3100 includes a user video field 3102 in which a live camera view of the user (e.g., captured by a front-facing camera of the user's electronic communication device 102) is presented and a model video field 3104 in which the model video clip is presented (e.g., in reduced screen area as compared to video clip 3102). Recording graphical user interface 3100 additionally includes a recording control 3106 that, when selected by the user, causes VCA 208*c* to play the model video clip from the beginning in model video clip field 3104 and to simultaneously capture a video clip in imitation of the model video clip via camera circuitry 238.

Returning to FIG. 28, the process proceeds from block 518 to block 2810, which illustrates processor 200 transmitting a "follow along" message to the video-based competition platform via communication network(s) 104. The "follow along" message includes, for example, the video clip submitted by the user and the identities of the other user(s), if any, to be challenged to participate in the competition as competitors and/or invited to vote in the competition. Following block 2810, the process of FIG. 28 ends at block 2812.

As has been described, the present application discloses a video-based competition platform that supports video-based competitions between possibly geographically distributed competitors. The video-based competition platform enables users of electronic communication devices to create, compete, view, and vote in video-based competitions. In at least some embodiments, a video-based competition is presented to a user with two or more video clips played in conjunction. The video clips may be synchronized to a time base and/or common audio track.

While various inventions have been particularly shown as described with reference to one or more preferred embodiments, it will be understood by those skilled in the art that various changes in form and detail may be made therein without departing from the spirit and scope of the invention. For example, although various embodiments have been described in which various functions are performed through the execution of one or more applications on an electronic communication device, it should be appreciated that in other embodiments the inventive functions may be performed on an application service provider platform 116 accessed by the electronic communication device, for example, through execution of a browser application 216 or other remote access software. Similarly, it should be appreciated that the described functions need not all be performed on a single physical platform, but can instead be performed on multiple communicatively coupled physical platforms (e.g., which may be communicatively coupled via short range communication interfaces 232 or wireless WAN interfaces 230).

The disclosed embodiments address a number of technical challenges with implementing a video-based competition platform. For example, in embodiments in which a user-created video is to be synchronized with an audio clip from a pre-existing audio track, a user interface is needed that enables the user to conveniently specify a temporal location and duration of the audio clip within the audio track. In at least some embodiments, this challenge is met by implementing a service that generates a graphical waveform representative of the time-varying characteristics of the audio track, presenting this graphical waveform to the user, and allowing the user to graphically specify a desired temporal location of at least a starting point of the audio clip by reference to the graphical waveform. The user interface coordinates are then translated into the temporal location.

In at least some embodiments, another technical challenge overcome by the disclosed embodiments is to enable synchronization of the user-generated video content with the user-selected audio clip without excessive video retakes to achieve the desired synchronization. Thus, it is desired that the final user-created video asset start its audio presentation at the user-selected temporal location of the starting point of the audio clip, continue the audio presentation for a user-selected duration, and present the audio in synchronization with the user-captured video so that the subject of the video is in time with the audio clip. To overcome this challenge, an audio lead-in is preferably presented during a video countdown to recording, and VCA 208c begins capturing video content once the video countdown has completed. This removes the need to trim significant frames from the final video composition. The audio clip and the video clip are then merged into a single video asset.

In at least some embodiments, another technical challenge overcome by the disclosed embodiments is to enable two or more video assets to be presented simultaneously for voting rather than in sequence. To achieve the capability of this style of presentation for voting, multiple independently controllable video players play multiple independent video streams simultaneously. When and if desired, the presentation of the multiple independently controllable video players can be synchronized by an observer process within VCA 208c. In at least one embodiment, the observer process optionally automatically mutes the audio presentation of all but one of the video clips.

It should be appreciated that references to an "embodiment" or "embodiments" may, but do not necessarily, refer to the same embodiment or embodiments. Further, the term "exemplary" is defined herein as meaning one example of the described feature, but not necessarily the only or preferred example of the feature. As utilized herein, the term "video clip" is defined to mean a video recording, which may be, but is not required to be, only a portion of a longer video work. Thus, depending on the type and parameters of a video-based competition, the video clip(s) utilized in the video-based competition may each be a complete video work or only a portion of a video work.

In the figures referenced herein, each block of a flowchart or block diagram may represent a module, segment, or portion of executable instructions or objects for implementing the specified logical function(s). Although the flowcharts contained herein necessarily depict processing steps being performed in a particular order, it will be appreciated by those skilled in the art that in various embodiments at least some of the processing steps can be performed concurrently, in a partially temporally overlapping manner, or in a different order than depicted. It should also be appreciated that each block of the block diagrams and/or flowcharts, as well as combinations of blocks in the block diagrams and/or flowcharts, can be implemented by special purpose hardware that perform the specified functions.

The inventions disclosed herein may be realized as a system, a method, and/or a computer program product. A computer program product may include a storage device having computer-readable program code stored thereon for causing a processor to carry out aspects of the inventions. The storage device may be, for example, an electronic storage device, a magnetic storage device, an optical storage device, an electromagnetic storage device, a semiconductor storage device, or any suitable combination of the foregoing. Specific examples of the storage device include a portable computer diskette, hard disk, random access memory (RAM), static random access memory (SRAM), read-only memory (ROM), an erasable programmable memory (EPROM or Flash memory), compact disc (CD), digital versatile disk (DVD), and a memory stick. A "storage device," as used herein, is specifically defined to include only statutory subject matter and to exclude non-statutory subject matter, such as signal media per se, transitory propagating signals per se, and energy per se.

What is claimed is:

1. A method in a data processing system, the method comprising:
    a processor of the data processing system providing independent playback in a plurality of video players of a plurality of video clips concurrently presented within a single display device, wherein the plurality of video clips belong to a video-based competition, wherein providing independent playback of the plurality of video clips includes the processor providing concurrent playback, within the single display device, of video content of all of the plurality of video clips in synchrony with a single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and
    the processor, based on an input of a user, recording a vote of the user for one of the plurality of video clips in the video-based competition.

2. The method of claim 1, wherein providing independent playback includes playing the plurality of video clips in synchrony with each other.

3. The method of claim 1, and further comprising:
    the processor tallying the vote of the user with one or more votes of one or more other users and publishing a result of the video-based competition.

4. The method of claim 1, wherein:
    the data processing system is a first electronic communication device; and
    the method further comprises a second electronic communication device initiating creation of the video-based competition based on a create input received at the second electronic communication device.

5. The method of claim 4, and further comprising the second electronic communication device selecting the single common audio clip to be audibly presented in conjunction with the plurality of video clips.

6. The method of claim 4, and further comprising:
    based on one or more first inputs, the second electronic communication device excerpting the single common audio clip from a pre-existing audio track, such that less than all of the pre-existing audio track is utilized to form the single common audio clip;

based on one or more second inputs, the second electronic communication device causing video content and audio content to be captured utilizing the second data processing system;

the second electronic communication device forming a video asset by merging the single common audio clip with the video content in place of the audio content captured by the second data processing system; and the second electronic communication device initiating inclusion of the video asset in the video-based competition.

7. The method of claim 6, and further comprising:

the second electronic communication device, based on a third input, initiating transmission of an electronic message inviting a user associated with a third electronic communication device to participate as a competitor in the video-based competition.

8. The method of claim 1, wherein:

the method further comprises the data processing system receiving an invitation to vote in the video-based competition; and providing concurrent playback includes providing concurrent playback, within the single display device, of video content of all of the plurality of video clips in synchrony with a single common audio clip based on acceptance of the invitation.

9. The method of claim 1, wherein the video-based competition is a first video-based competition, the method further comprising:

the processor, based on a join input, capturing a video clip produced by the user and including the video clip in a second video-based competition.

10. The method of claim 1, and further comprising:

receiving the input of the user, wherein receiving the input of the user includes detecting a gestural input of the user.

11. The method of claim 10, wherein the gestural input includes a swipe gesture.

12. The method of claim 1, and further comprising:

based on receiving the input of the user, ending playback of one of the plurality of video clips within the single display device.

13. The method of claim 12, wherein ending playback of one of the plurality of video clips includes removing presentation of the one of the plurality of video clips from the single display device while continuing playback of at least one other of the plurality of video clips within the single display device.

14. The method of claim 1, and further comprising presenting a countdown timer for voting in the video-based competition.

15. The method of claim 1, wherein the recording includes recording a vote of the user for multiple of the plurality of video clips in the video-based competition.

16. A data processing system, comprising:

a processor;

data storage coupled to the processor, the data storage including program code that is executable by the processor to cause the processor to perform:

providing independent playback in a plurality of video players of a plurality of video clips concurrently presented within a single display device communicatively coupled to the data processing system, wherein the plurality of video clips belong to a video-based competition, and wherein providing independent playback of the plurality of video clips includes the processor providing concurrent playback, within the single display device, of video content of all of the plurality of video clips in synchrony with a single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and based on an input of a user, recording a vote of the user for one of the plurality of video clips in the video-based competition.

17. The data processing system of claim 16, wherein providing independent playback includes playing the plurality of video clips in synchrony with each other.

18. The data processing system of claim 16, wherein the recording includes recording a vote of the user for multiple of the plurality of video clips in the video-based competition.

19. A program product, comprising:

a storage device;

program code stored in the storage device and executable by a processor of a data processing system to cause the processor to perform:

providing independent playback in a plurality of video players of a plurality of video clips concurrently presented within a single display device communicatively coupled to the data processing system, wherein the plurality of video clips belong to a video-based competition, and wherein providing playback, of the plurality of video clips includes the processor providing concurrent independent playback, within the single display device, of video content of all of the plurality of video clips in synchrony with a single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and based on an input of a user, recording a vote of the user for one of the plurality of video clips in the video-based competition.

20. The program product of claim 19, wherein providing independent playback includes playing the plurality of video clips in synchrony with each other.

21. The program product of claim 19, wherein the recording includes recording a vote of the user for multiple of the plurality of video clips in the video-based competition.

22. A method in a data processing system, the method comprising:

based on one or more user inputs, a processor of the data processing system receiving identification of a single common audio clip to be used in a video-based competition;

the processor receiving, via a network, a video clip;

the processor of the data processing system providing, via the network, independent playback in a plurality of video players of a plurality of video clips concurrently presented within a single display device of a remote electronic communication device, wherein the plurality of video clips belongs to a video-based competition and includes the video clip, and wherein providing independent playback of the plurality of video clips includes the processor providing concurrent playback, within the single display device, of video content of all of the plurality of video clips in synchrony with the single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and the processor, based on an input of a user, recording a vote of the user for one of the plurality of video clips in the video-based competition.

23. The method of claim 22, wherein:

the single common audio clip comprises audio content of a particular video clip among the plurality of video clips; and providing concurrent playback comprises the processor of the data processing system automatically muting audio content of all of the plurality of video clips except the particular video clip while providing concurrent playback, within the single display device, of video content of all of the plurality of video clips in synchrony with the single common audio clip.

24. A data processing system, comprising:

a processor;

data storage coupled to the processor, the data storage including program code that is executable by the processor to cause the processor to perform:

based on one or more user inputs, the processor receiving identification of a single common audio clip to be used in a video-based competition;

the processor receiving, via a network, a video clip;

the processor of the data processing system providing, via the network, independent playback in a plurality of video players of a plurality of video clips concurrently presented within a single display device of a remote electronic communication device, wherein the plurality of video clips belongs to a video-based competition and includes the video clip, and wherein providing independent playback of the plurality of video clips includes the processor providing concurrent playback, within the single display device, of video content of all of the plurality of video clips in synchrony with the single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and the processor, based on an input of a user, recording a vote of the user for one of the plurality of video clips in the video-based competition.

25. A program product, comprising:

a storage device;

program code stored in the storage device and executable by a processor of a data processing system to cause the processor to perform:

based on one or more user inputs, receiving identification of a single common audio clip to be used in a video-based competition;

receiving, via a network, a video clip;

providing, via the network, independent playback in a plurality of video players of a plurality of video clips concurrently presented within a single display device of a remote electronic communication device, wherein the plurality of video clips belongs to a video-based competition and includes the video clip, and wherein providing independent playback of the plurality of video clips includes the processor providing concurrent playback, within the single display device, of video content of all of the plurality of video clips in synchrony with the single common audio clip, wherein the single common audio clip is a portion of a pre-existing audio track merged with each of the plurality of video clips in place of audio content originally captured with the video content of the plurality of video clips, and wherein the processor causes the common audio clip to be audibly presented during an entirety of the concurrent playback of the plurality of video clips in synchrony with the single common audio clip; and based on an input of a user, recording a vote of the user for one of the plurality of video clips in the video-based competition.

\* \* \* \* \*